US012454637B2

United States Patent
Yook et al.

(10) Patent No.: US 12,454,637 B2
(45) Date of Patent: *Oct. 28, 2025

(54) SILICONE HYBRID PRESSURE SENSITIVE ADHESIVE AND METHODS FOR ITS PREPARATION AND USE IN PROTECTIVE FILMS FOR (OPTO)ELECTRONIC DEVICE FABRICATION

(71) Applicant: Dow Silicones Corporation, Midland, MI (US)

(72) Inventors: Juyoung Yook, Chungcheongbuk-do (KR); Nanguo Liu, Midland, MI (US); Zachary Wenzlick, Midland, MI (US); Hojin Choi, Chungcheongbuk-do (KR); Bo Kyung Bona Kim, Chungcheongbuk-do (KR)

(73) Assignee: Dow Silicones Corporation, Midland, MI (US)

( * ) Notice: Subject to any disclaimer, the term of this patent is extended or adjusted under 35 U.S.C. 154(b) by 498 days.

This patent is subject to a terminal disclaimer.

(21) Appl. No.: 17/802,272

(22) PCT Filed: Mar. 1, 2021

(86) PCT No.: PCT/US2021/020208
§ 371 (c)(1),
(2) Date: Aug. 25, 2022

(87) PCT Pub. No.: WO2021/225673
PCT Pub. Date: Nov. 11, 2021

(65) Prior Publication Data
US 2023/0091861 A1    Mar. 23, 2023

Related U.S. Application Data

(60) Provisional application No. 63/021,186, filed on May 7, 2020.

(51) Int. Cl.
| | | |
|---|---|---|
| *C09J 183/06* | (2006.01) | |
| *C08K 5/00* | (2006.01) | |
| *C08K 5/07* | (2006.01) | |
| *C08K 5/08* | (2006.01) | |
| *C08K 5/13* | (2006.01) | |
| *C08G 77/12* | (2006.01) | |
| *C08G 77/20* | (2006.01) | |

(52) U.S. Cl.
CPC .......... *C09J 183/06* (2013.01); *C08K 5/0025* (2013.01); *C08K 5/07* (2013.01); *C08K 5/08* (2013.01); *C08K 5/13* (2013.01); *C08G 77/12* (2013.01); *C08G 77/20* (2013.01); *C08L 2312/06* (2013.01); *C09J 2301/302* (2020.08)

(58) Field of Classification Search
CPC .............................. C09J 183/04; C09J 183/06
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby et al. |
| 3,220,972 A | 11/1965 | Lamoreaux et al. |
| 3,296,291 A | 1/1967 | Scotia et al. |
| 3,419,593 A | 12/1968 | Willing et al. |
| 3,516,946 A | 6/1970 | Scotia et al. |
| 3,814,730 A | 6/1974 | Karstedt et al. |
| 3,878,263 A | 4/1975 | Martin |
| 3,989,668 A | 11/1976 | Lee et al. |
| 4,250,053 A | 2/1981 | Smith |
| 4,286,047 A | 8/1981 | Bennett et al. |
| 4,503,208 A | 3/1985 | Lin et al. |
| 4,584,355 A | 4/1986 | Blizzard et al. |
| 4,585,669 A | 4/1986 | Eckberg |
| 4,585,836 A | 4/1986 | Homan et al. |
| 4,587,137 A | 5/1986 | Eckberg |
| 4,591,622 A | 5/1986 | Blizzard et al. |

(Continued)

FOREIGN PATENT DOCUMENTS

| | | |
|---|---|---|
| CA | 2336195 A1 | 12/1999 |
| EP | 0347895 B | 11/1993 |

(Continued)

OTHER PUBLICATIONS

Abstract for CN 115678454 (document publication date Feb. 3, 2023).*
"Macromolecular Materials and Engineering" by Hung-Wen et al, 2007, vol. 292, Issue 5, pp. 666-673.
ASTM Standard E-168-16.
Husar, "The formulator's guide to anti-oxygen inhibition additives." Progress in Organic Coatings2014, 77.11, pp. 1789-1798.
Noll, "Chemistry and Technology of Silicone", Academic Press, 1968, chapter 5, pp. 190-245.

*Primary Examiner* — Marc S Zimmer
(74) *Attorney, Agent, or Firm* — Catherine U. Brown

(57) ABSTRACT

A silicone hybrid pressure sensitive adhesive composition that cures to form a silicone hybrid pressure sensitive adhesive contains a polydiorganosiloxane having reactive groups. The reactive groups include a silicon bonded(meth) acryloxyalkyl-functional group in a pendant position and optionally a silicon bonded aliphatically unsaturated hydrocarbon group in a terminal position. The silicone hybrid pressure sensitive adhesive composition can be cured via hydrosilylation reaction on a surface of a substrate to form a protective film. The protective film can be used to protect a passivation layer during a process for fabricating an (opto)electronic device such as a flexible organic light emitting diode display. The protective film can be exposed to radiation to reduce tack and facilitate detaching the protective film from the passivation layer.

17 Claims, No Drawings

(56) References Cited

U.S. PATENT DOCUMENTS

| | | |
|---|---|---|
| 4,611,042 A | 9/1986 | Rivers-Farrell et al. |
| 4,766,176 A | 8/1988 | Lee et al. |
| 4,774,310 A | 9/1988 | Butler |
| 4,784,879 A | 11/1988 | Lee et al. |
| 4,968,559 A | 11/1990 | Kuroda et al. |
| 5,010,159 A | 4/1991 | Bank et al. |
| 5,017,654 A | 5/1991 | Togashi et al. |
| 5,036,117 A | 7/1991 | Chung et al. |
| 5,118,567 A | 6/1992 | Komiyama et al. |
| 5,175,325 A | 12/1992 | Brown et al. |
| 5,217,805 A | 6/1993 | Kessel et al. |
| 5,281,473 A | 1/1994 | Ishiwata et al. |
| 5,457,220 A | 10/1995 | Razzano |
| 5,516,858 A | 5/1996 | Morita et al. |
| 5,982,041 A | 11/1999 | Mitani et al. |
| 6,000,603 A | 12/1999 | Koskenmaki et al. |
| 6,239,246 B1 | 5/2001 | Takahashi et al. |
| 6,281,285 B1 | 8/2001 | Becker et al. |
| 6,387,487 B1 * | 5/2002 | Greenberg ............. C09J 183/04 428/355 R |
| 6,677,740 B1 | 1/2004 | Chen et al. |
| 6,906,425 B2 | 6/2005 | Stewart et al. |
| 7,659,003 B2 | 2/2010 | Aoki et al. |
| 8,076,411 B2 | 12/2011 | Maton et al. |
| 8,377,634 B2 | 2/2013 | Albaugh et al. |
| 8,436,122 B2 | 5/2013 | Kho et al. |
| 8,580,862 B2 | 11/2013 | Barnes et al. |
| 8,618,234 B2 | 12/2013 | Mizuno et al. |
| 8,920,592 B2 | 12/2014 | Suwa et al. |
| 9,023,433 B2 | 5/2015 | Fu et al. |
| 9,051,428 B2 | 6/2015 | Davio et al. |
| 9,475,968 B2 | 10/2016 | Hammond et al. |
| 9,593,209 B2 | 3/2017 | Dent et al. |
| 9,751,988 B2 | 9/2017 | Jo et al. |
| 9,853,193 B2 | 12/2017 | Amako et al. |
| 10,167,418 B2 | 1/2019 | Yamazaki et al. |
| 10,208,164 B2 | 2/2019 | Dogen et al. |
| 2002/0071958 A1 | 6/2002 | Mertz et al. |
| 2004/0116547 A1 | 6/2004 | Bennington |
| 2011/0111217 A1 | 5/2011 | Kuroda et al. |
| 2011/0224593 A1 | 9/2011 | Tunius |
| 2015/0147510 A1 | 5/2015 | Saito |
| 2018/0305547 A1 | 10/2018 | Dogen et al. |
| 2019/0148598 A1 | 5/2019 | Bower et al. |

FOREIGN PATENT DOCUMENTS

| | | |
|---|---|---|
| JP | H0853156 A | 2/1996 |
| JP | 3043988 B2 | 5/2000 |
| JP | 2000252342 A | 9/2000 |
| JP | 200327017 A | 1/2003 |
| JP | 2007254661 A | 10/2007 |
| KR | 101301941 B1 | 8/2013 |
| WO | 1997006836 A2 | 2/1997 |
| WO | 2000061692 A1 | 10/2000 |
| WO | 2014200112 A1 | 12/2014 |
| WO | 2015126780 A1 | 8/2015 |
| WO | 2015182816 A1 | 12/2015 |
| WO | 2015187909 A1 | 12/2015 |
| WO | 2015194654 A1 | 12/2015 |
| WO | 2016175365 A1 | 11/2016 |
| WO | 2017068762 A1 | 4/2017 |
| WO | 2017182638 A1 | 10/2017 |
| WO | 2018169280 A1 | 9/2018 |
| WO | 2019070866 A1 | 4/2019 |
| WO | 2020186127 A1 | 9/2020 |

* cited by examiner

SILICONE HYBRID PRESSURE SENSITIVE ADHESIVE AND METHODS FOR ITS PREPARATION AND USE IN PROTECTIVE FILMS FOR (OPTO)ELECTRONIC DEVICE FABRICATION

CROSS REFERENCE TO RELATED APPLICATIONS

This application is a U.S. national stage filing under 35 U.S.C. § 371 of PCT Application No. PCT/US21/020208 filed on 1 Mar. 2021, currently pending. which claims the benefit of U.S. Provisional Patent Application No. 63/021,186 filed 7 May 2020 under 35 U.S.C. § 119 (e). PCT Application No. PCT/US21/020208 and U.S. Provisional Patent Application No. 63/021,186 are each hereby incorporated by reference.

TECHNICAL FIELD

This invention relates to a silicone hybrid pressure sensitive adhesive composition that cures to form a silicone hybrid pressure sensitive adhesive. The silicone hybrid pressure sensitive adhesive is useful in processes for fabricating (opto)electronic devices such as flexible organic light emitting diode (OLED) displays.

BACKGROUND

In a typical process for fabricating a flexible OLED display, an OLED is formed on a relatively rigid substrate (e.g., thin film metal(oxide) or metal(oxide) coated with a polyimide varnish), and a passivation layer is formed on the surface of the OLED opposite the substrate. Weak or brittle layers need to be protected from damage (e.g., scratches or other shocks) during the further processing.

To protect the layers during the fabrication process, a protective film with low adhesion is desired to prevent delamination of a layer (e.g., passivation layer) on a surface of an OLED module during releasing of the protective film after use. If adhesion control fails (or is too low), a protective film may delaminate prematurely. If adhesion is a bit high to hold a layer of an OLED module tightly, the layer may be damaged when the protective film is removed. Therefore, there is an industry need to provide protective films with appropriate adhesion to protect the layers during processing but that can be removed without damaging the layers.

It is also important that the surface of the layer remain clean such that additional films or layers can be laminated thereto after removal of the protective film. Therefore, there is an industry need to provide a protective film with low migration such that no or minimal amounts of adhesive from the protective film remain on the surface of the layer in the flexible OLED device after the protective film is removed.

BRIEF SUMMARY OF THE INVENTION

A silicone hybrid pressure sensitive adhesive composition and method for its preparation are provided. A method for preparing a protective film from the silicone hybrid pressure sensitive adhesive film is also provided. A method for using the protective film in a method for fabricating an (opto)electronic device is also provided.

DETAILED DESCRIPTION OF THE INVENTION

The silicone hybrid pressure sensitive adhesive composition comprises: (A) a linear, or substantially linear, polydiorganosiloxane having reactive groups comprising a silicon bonded (meth)acryloxyalkyl-functional group in a pendant position and optionally a silicon bonded aliphatically unsaturated hydrocarbon group in a terminal position; (B) a polyorganosilicate resin; (C) a polyorganohydrogensiloxane; (D) a hydrosilylation reaction catalyst; (E) a photoradical initiator; (F) a hydrosilylation reaction inhibitor; and (G) a free radical scavenger. The silicone hybrid pressure sensitive adhesive composition may optionally further comprise one or more of (H) a solvent and (I) an additive selected from the group consisting of a sensitizer and a synergist.

(A) Polydiorganosiloxane Having Reactive Groups

The silicone hybrid pressure sensitive adhesive composition comprises 100 parts by weight of starting material (A) a linear, or substantially linear, polydiorganosiloxane having reactive groups comprising a silicon bonded (meth)acryloxyalkyl-functional group in a pendant position and optionally a silicon bonded aliphatically unsaturated hydrocarbon group in a terminal position. Starting material (A) comprises unit formula $M_p M''_q D_m D'_n D''_o T'''_r Q_s$, where M represents a unit of formula $(R^1_3 SiO_{1/2})$, M'' represents a unit of formula $(R^1_2 R^3 SiO_{1/2})$, D represents a unit of formula $(R^1_2 SiO_{2/2})$, D' represents a unit of formula $(R^1 R^2 SiO_{2/2})$, D'' represents a unit of formula $(R^1 R^3 SiO_{2/2})$, T''' represents a unit of formula $(R^5 SiO_{3/2})$, and Q represents a unit of formula $(SiO_{4/2})$. In these units, each $R^1$ is a monovalent hydrocarbon group free of aliphatic unsaturation, each $R^2$ is the (meth)acryloxyalkyl functional group, each $R^3$ is the aliphatically unsaturated monovalent hydrocarbon group, each $R^5$ is independently selected from the group consisting of $R^1$, $R^2$, and $R^3$; and subscripts p, q, m, n, r, and s have values such that $0 \leq p$, $0 \leq q$, a quantity $(p+q) \geq 2$, $0 < m < 10,000$, $2 < n \leq 10,000$, $o \geq 0$, a quantity $(m+n+o)$ is 100 to 10,000, a ratio $(m+o)/n$ is 1/1 to 500/1, a ratio $(q+o)/(m+n)$ is $0 \leq$ to 1/5, $0 \leq r \leq 100$, and $0 \leq s \leq 100$; a ratio $(m+n+o)/(r+s)$ is 50/1 to 10,000/1 if $0 < r$ or if $0 < s$. The polydiorganosiloxane may optionally further comprise small amounts of units of formula $M^{OH}$, where $M^{OH}$ has formula $[R^1_2(HO)SiO_{1/2}]$, where $R^1$ is described above. Without wishing to be bound by theory, it is thought that a small amount of terminal $M^{OH}$ residuals as impurity may be present in starting material (A), although $M^{OH}$ incorporation is not intended during synthesis, and the hydroxyl group is not expected to significantly impact on this application.

Suitable monovalent hydrocarbon groups (which are free of aliphatic unsaturation) for $R^1$ in the unit formula above include alkyl groups and aryl groups. The alkyl group may be branched, unbranched, or cyclic. Examples of alkyl groups include methyl, ethyl, propyl (including n-propyl and/or isopropyl), butyl (including iso-butyl, n-butyl, tert-butyl, and/or sec-butyl), pentyl (including, iso-pentyl, neopentyl, and/or tert-pentyl); and hexyl, heptyl, octyl, nonyl, and decyl, as well as branched saturated monovalent hydrocarbon groups of 6 or more carbon atoms; and cyclic alkyl groups such as cyclopentyl or cyclohexyl. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom. The aryl group includes, alternatively is, a hydrocarbon group derived from an arene by removal of a hydrogen atom from a ring carbon atom. Aryl is exemplified by, but not limited to, phenyl, naphthyl, benzyl, tolyl, xylyl, phenylethyl, phenyl propyl, and phenyl butyl. Aryl groups have at least 5 carbon atoms. Monocyclic aryl groups may have 5 to 12 carbon atoms, alternatively 6 to 9 carbon atoms, and alternatively 6 carbon atoms. Polycyclic aryl groups may have 9 to 17 carbon atoms, alternatively 9 to 14 carbon atoms, and alternatively 9 to 12 carbon atoms. Alternatively, for $R^1$, the alkyl group may be methyl, and the aryl group may be phenyl. Alternatively, each $R^1$ may be an alkyl group, as described above. Starting material (A) may contain 70 mol % or greater, alternatively 80 mol % or greater, of $R^1$ based on combined amounts of $R^1$, $R^2$, and $R^3$; and each $R^1$ may be methyl. Without wishing to be bound by theory, it is thought that methyl groups are non-reactive and likely to afford wettability on the surface of an adherend as well as stability (e.g., no or minimal thermal shrinkage, degradation) after thermal treatment of the silicone hybrid pressure sensitive adhesive (e.g., after exposure to temperatures up to 200° C. during (opto)electronic device fabrication processes).

Suitable (meth)acryloxyalkyl functional groups for $R^2$ in the unit formulas herein are each independently selected from the group consisting of acryloxypropyl and methacryloxypropyl. $R^2$ may be present in a mole % of 0.1% to 25% based on combined amounts of $R^1$, $R^2$, and $R^3$. Alternatively, $R^2$ may be present in a mole % of 0.8% to 12%. Alternatively, $R^2$ may be present in a mole % of 1.5% to 6%. Alternatively, starting material (A) may contain 0.1 to 25 mol %, alternatively 0.2 to 3 mol %, of $R^2$ based on combined amounts of $R^1$, $R^2$, and $R^3$.

Suitable aliphatically unsaturated monovalent hydrocarbon groups for $R^3$ include alkenyl and alkynyl groups. The alkenyl group has a double bond and may be branched or unbranched. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms. Suitable alkenyl groups include, but are not limited to vinyl, allyl, and hexenyl; alternatively vinyl and hexenyl. The alkynyl group has a triple bond and may be branched or unbranched. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms. Alkynyl groups include ethynyl and propynyl. Alternatively, each aliphatically unsaturated monovalent hydrocarbon group for $R^3$ is an independently selected alkenyl group, which may be selected from the group consisting of vinyl and hexenyl. Starting material (A) may contain 0 to 6 mol %, alternatively 0.001 to 3 mol %, of $R^3$, and alternatively 0.005 mol % to 0.2 mol %, based on combined amounts of $R^1$, $R^2$, and $R^3$.

When starting material (A) has subscript p=2, and subscripts o=q=r=s=0, starting material (A) may comprise unit formula $M_2D_mD'_n$, where a quantity (m+n) is 100 to 10,000, and a ratio m/n is 1/1 to 500/1. Alternatively, the quantity (m+n) may be 200 to 9,900. Alternatively, the quantity (m+n) may be 300 to 7,000; and alternatively 400 to 6,000. Alternatively, the quantity (m+n) may be 1,000 to 5,000. Alternatively, the ratio m/n may be 10/1 to 400/1; and alternatively 20/1 to 300/1.

Starting material (A) can be made through condensation or equilibration reaction by using (meth)acryl functional silane reagents with reference to "Chemistry and Technology of Silicone" by Noll, Academic Press, 1968, chapter 5, p 190-245. Hereinafter, practical methods for the preparation of polydiorganosiloxane (A) are described as following, but not limited to these methods. For example, polydiorganosiloxane (A) can be made via one-pot synthesis using silanol fluid, (meth)acryl functional dialkoxysilane, and an endblocker in the presence of triflic acid catalyst. Heptane or toluene was used to facilitate the methanol removal by azeotropic distillation. Water was also added to the reaction to ensure complete hydrolysis of 3-methacryloxypropylmethyldimethoxysilane. After reaction was completed, neutralizers such as calcium carbonate were used to neutralize triflic acid, and filtered out after treatment. The other method is that it can be made via pre-hydrolysis of (meth)acryl functional dialkoxysilane and subsequent condensation/disproportionation reactions involving silanol fluid and an endblocker in the presence of phosphazene catalyst (described in U.S. Pat. No. 9,051,428 to Davio et al). Toluene was used to reduce the viscosity and facilitate the water/methanol removal by azeotropic distillation. After reaction was completed, neutralizers such as trialkylamines and disilazane derivatives were used to neutralize acidic catalyst, and filtered out after treatment.

Depending on selection of intermediates, various structure of polydiorganosiloxane (A) can be obtained. (Meth)acryl functional dialkoxysilane can be selected from 3-[dimethoxy(methyl)silyl]propyl methacrylate (CAS #14513-34-9) and 3-[dimethoxy(methyl)silyl]propyl acrylate (CAS #13732-00-8). Silanol fluid may be selected from be hydroxy-terminated polydimethylsiloxane (CAS #70131-67-8), hydroxy-terminated vinylmethylsiloxane-dimethylsiloxane copolymer (CAS #67923-19-7), hydroxy-terminated polyvinylmethylsiloxane (CAS #68083-20-5), hydroxy-terminated polyphenylmethylsiloxane (CAS #80801-30-5), diphenylsilanediol (CAS #947-42-2). An endblocker may be selected from hexamethyldisiloxane (CAS #107-46-0), 1,3-divinyltetramethyldisiloane (CAS #2626-95-4), and dimethylvinylsiloxy-terminated polydimethylsiloxane (CAS #68083-19-2). Additionally, dialkoxy- or dichloro-silane, such as dimethoxydiphenylsilane (CAS #6843-66-9), dimethoxymethylvinylsilane (CAS #16753-62-1), dichlorodiphenylsilane (CAS #80-10-4), 3-mercpatopropylmethyldimethoxysilane (CAS #31001-77-1), dimethoxy(methyl)(3,3,3-trifluoropropyl)silane (CAS #358-67-8), diethoxy(methyl)phenylsilane (CAS #775-56-4), diethoxymethylsilane (CAS #2031-62-1), dimethoxymethylsilane (CAS #16881-77-9), can be added as co-reactants. Moreover, a small amount of trialkoxysilane, and tetraalkoxysilane such as trimethoxy (methyl)silane (CAS #1185-55-3), 3-(trimethoxysilyl)propyl methacrylate (CAS #2530-85-0), 3-(triethoxysilyl)propyl methacrylate (CAS #21142-29-0), tetramethyl orthosilicate (CAS #681-84-5) can be added to obtain branched structures. Typical catalysts for condensation reaction were summarized in U.S. Pat. No. 8,076,411 to Maton et al.

Examples of polydiorganosiloxanes suitable for use as starting material (A) include one or more of the following average composition formulas: average formulas (Ai) to Axiv), below). In the average composition formulas, the subscripts after each unit represent average number of that unit per molecule. In the average formulas, the subscripts after each unit represent mole fractions of that unit. In the formulas below, 'R' represents the combined amounts of $R^1$, $R^2$, and $R^3$, described above.

Ai) $(ViMe_2SiO_{1/2})_2(MaMeSiO_{2/2})_{10}(Me_2SiO_{2/2})_{1000}$
Aii) $(ViMe_2SiO_{1/2})_2(MaMeSiO_{2/2})_{50}(Me_2SiO_{2/2})_{2000}$
Aiii) $(Me_3SiO_{1/2})_2(MaMeSiO_{2/2})_{500}(Me_2SiO_{2/2})_{6000}$
Aiv) $(ViMe_2SiO_{1/2})_2(MaMeSiO_{2/2})_{1000}(Me_2SiO_{2/2})_{6000}$
Av) $(ViMe_2SiO_{1/2})_2(MaMeSiO_{2/2})_{50}(Me_2SiO_{2/2})_{1990}(ViMeSiO_{2/2})_{200}$
Avi) $(Me_3SiO_{1/2})_2(MaMeSiO_{2/2})_{50}(Me_2SiO_{2/2})_{1990}(ViMeSiO_{2/2})_{200}$ Avii) $(Me_3SiO_{1/2})_2(MaMeSiO_{2/2})_{50}(Me_2SiO_{2/2})_{1990}(HexMeSiO_{2/2})_{50}$ Aviii) $(Me_3SiO_{1/2})_2(MaMeSiO_{2/2})_{50}(Me_2SiO_{2/2})_{1990}(HexMeSiO_{2/2})_{50}$ Aix) $(ViMe_2SiO_{1/2})_2(MaMeSiO_{2/2})_{1000}(Me_2SiO_{2/2})_{6000}(PhMeSiO_{2/2})_{100}$ Ax) $(ViMe_2SiO_{1/2})_3(MaMeSiO_{2/2})_{100}(Me_2SiO_{2/2})_{1900}(MeSiO_{3/2})$ Axi) $(Me_3SiO_{1/2})_4(MaMeSiO_{2/2})_{50}(Me_2SiO_{2/2})_{3960}(SiO_{4/2})$ Axii) $(Me_3SiO_{1/2})_3(MaMeSiO_{2/2})_{20}(Me_2SiO_{2/2})_{1979}(ViMeSiO_{2/2})_{100}(MeSiO_{3/2})$ Axiii) $(ViMe_2SiO_{1/2})_2(MaMeSiO_{2/2})_{1000}(Me_2SiO_{2/2})_{6000}(PhPhSiO_{2/2})_{100}$ Axiv) $(ViMe_2SiO_{1/2})_2(MaMeSiO_{2/2})_{16}(Me_2SiO_{2/2})_{265}$ (B) Polyorganosilicate Resin Starting material (B) is a polyorganosilicate resin. The polyorganosilicate resin is used in the silicone hybrid pressure sensitive adhesive composition in an amount sufficient to provide a weight ratio of (B) the polyorganosilicate resin to (A) the polydiorganosiloxane (Resin/Polymer Ratio) of 0.15/1 to 1.9/1. Alternatively, the Resin/Polymer Ratio may be 0.2/1 to 1.5/1. Alternatively, the Resin/Polymer Ratio may be 0.25/1 to 1.2/1.

The polyorganosilicate resin comprises unit formula $M_aM''_bM'''_cD_dD'_eT'''_fQ_hX_i$, where M, M'', D, D', T''', and Q are as described above, M''' represents a unit of formula $(R^1_2R^2SiO_{1/2})$, X represents a hydroxyl group and/or alkoxy group, and subscripts a, b, c, d, e, f, h and i, have values such that a≥0, b≥0, c≥0, and a quantity (a+b+c)>10 mole %; d≥0, e≥0 and a quantity (d+e) is 0 to a number sufficient to provide up to 30 mole % of D units and D' units combined to the resin; f≥0, with the proviso that subscript f has a maximum value sufficient to provide 40 mole %, alternatively 30 mole %, of T''' units to the resin; h>0, with the proviso that subscript h has a value sufficient to provide 30 mole % to 70 mole %, alternatively 30 mole % to 60 mole %, of Q units to the resin; (a+b+c+d+e+f+h)=100 mole %; i≥0 is not included in the molar ratio, with the proviso that subscript i has a maximum value sufficient to provide 5 mole % of hydroxyl groups to the resin. Alternatively, the quantity (d+e) is 0 to a number sufficient to provide up to 20 mole % of D units and D' units combined to the resin. Alternatively, the quantity (d+e) is 0 to a number sufficient to provide up to 10 mole % of D units and D' units combined to the resin. Alternatively, the subscript h is 0 to a number sufficient to provide up to 15 mole % of T''' units to the resin. Alternatively, the subscript h is 0 to a number sufficient to provide up to 8 mole % of T''' units to the resin. Alternatively, subscripts c, e and f may have values such that 0≤(c+e+f)<20 mole % if b>0; and (c+e+f)=0 if b=0;

Alternatively, the polyorganosilicate resin may comprises a unit formula selected from the group consisting of $M_aQ_h$, $M_aM''_bQ_h$, $M_aM''_bM'''_cQ_h$, $M_aM'''_cQ_h$, $M_aD_dQ_h$, $M_aD'_eQ_h$, $M_aM''_bD'_eQ_h$, $M_aM''_bT'''_fQ_h$, $M_aM''_bT'''_fQ_h$, where subscript a, b and c is 20 to 70 mole %, subscript d and e is 1 to 20 mole %, subscript f is 1 to 25 mole %, and subscript h is 35 to 65 mole %. Alternatively, the polyorganosilicate resin may comprises a unit formula selected from the group consisting of $M_aQ_h$, $M_aM''_bQ_h$, $M_aM''_bM'''_cQ_h$, $M_aD_dQ_h$, $M''_bD'_eQ_h$, $M_aM''_bM'''_cD_dQ_h$, $M_aM''_bM'''_cD'_eQ_h$, $M_aM''_bD'_eQ_h$, $M_aM''_bM'''_cD'_eQ_h$, $M_aM''_bT'''_fQ_h$, $M_aM''_bM'''_cT'''_fQ_h$, where subscript a is 20 to 65 mole %, subscript b and c is 1 to 30 mole %, subscript d and e is 1 to 20 mole %, subscript f is 1 to 25 mole %, and subscript h is 35 to 55 mole %.

The polyorganosilicate resin may contain 0 to 20 mol % of $R^2$ based on combined amounts of $R^1$, $R^2$, and $R^3$ groups in the resin, where $R^1$, $R^2$, and $R^3$ are as described above. The polyorganosilicate resin may contain at least 70 mol % of $R^1$ (based on combined amounts of $R^1$, $R^2$, and $R^3$ groups in the resin). Alternatively, the polyorganosilicate resin may contain 0 to 15 mol % of $R^2$ based on combined amounts of $R^1$, $R^2$, and $R^3$ groups in the resin. Alternatively, the polyorganosilicate resin may contain at least 80 mol % of $R^1$ (based on combined amounts of $R^1$, $R^2$, and $R^3$ groups in the resin.

Examples of polyorganosilicate resins suitable for use as starting material (B) include one or more of Bi) to Bxi) below.

Bi) $(Me_3SiO_{1/2})_{0.45}(SiO_{4/2})_{0.55}$

Bii) $(Me_3SiO_{1/2})_{0.50}(SiO_{4/2})_{0.50}$

Biii) $(Me_3SiO_{1/2})_{0.42}(ViMe_2SiO_{1/2})_{0.05}(SiO_{4/2})_{0.53}(OH)_{0.02}$ Biv) $(Me_3SiO_{1/2})_{0.40}(ViMe_2SiO_{1/2})_{0.10}(SiO_{4/2})_{0.50}$ Bv) $(Me_3SiO_{1/2})_{0.42}(MaMe_2SiO_{2/2})_{0.05}(SiO_{4/2})_{0.53}(OH)_{0.02}$ Bvi) $(Me_3SiO_{1/2})_{0.4}(MaMe_2SiO_{2/2})_{0.2}(SiO_{4/2})_{0.40}$ Bvii) $(Me_3SiO_{1/2})_{0.42}(MaMe_2SiO_{3/2})_{0.05}(SiO_{4/2})_{0.53}$ Bviii) $(Me_3SiO_{1/2})_{0.4}(MaMe_2SiO_{3/2})_{0.2}(SiO_{4/2})_{0.40}$ Bix) $(Me_3SiO_{1/2})_{0.40}(ViMe_2SiO_{1/2})_{0.04}(MaMeSiO_{2/2})_{0.02}(SiO_{4/2})_{0.54}$ Bx) $(Me_3SiO_{1/2})_{0.40}(MaSiO_{1/2})_{0.04}(SiO_{4/2})_{0.56}$ Bxi) $(Me_3SiO_{1/2})_{0.40}(ViMe_2SiO_{1/2})_{0.02}(MaSiO_{1/2})_{0.02}(SiO_{4/2})_{0.56}$ Bxii) $(Me_3SiO_{1/2})_{0.42}(MaMe_2SiO_{1/2})_{0.05}(SiO_{4/2})_{0.53}$ The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the Polyorganosilicate Resin may have two, three or four hydrolyzable substituents per molecules, e.g., they may be diorganoalkoxysilanes, triorganoalkoxysilanes and silanes with four hydrolyzable substituents or alkali metal silicates. The intermediates may have formulae $R^M_2SiX^1_2$ and $R^MSiX^1_3$, respectively, where $R^M$ is selected from the group consisting of $R^1$, $R^2$, and $R^3$, described above, and $X^1$ represents a hydrolyzable substituent. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above typically contains silicon bonded hydroxyl groups, i.e., of formulae, $HOSi_{3/2}$, $HOR^MSiO_{2/2}$, and/or $HOR^M_2SiO_{1/2}$. The polyorganosilicate resin may comprise up to 5% of silicon bonded hydroxyl groups. The concentration of silicon bonded hydroxyl groups present in the polyorganosilicate resin may be determined using Fourier Transform-Infra Red (FTIR) spectroscopy according to ASTM Standard E-168-16. For certain applications, it may desirable for the amount of silicon bonded hydroxyl groups to be 2% or less, alternatively below 0.7%, alternatively below 0.3%, alternatively below 1%, and alternatively 0.3% to 0.8%. Silicon bonded hydroxyl groups formed during preparation of the polyorganosilicate resin can be converted to triorgano (e.g., trihydrocarbyl) siloxane groups or to a different hydrolyzable group by reacting the silicone resin with a silane, disilazane, or disilazane containing the appropriate terminal group. Silanes containing hydrolyzable groups may be added in molar excess of the quantity required to react with the silicon bonded hydroxyl groups on the polyorganosilicate resin.

Alternatively, the polyorganosilicate resin may further comprises 2% or less, alternatively 0.7% or less, and alternatively 0.3% or less, and alternatively 0.3% to 0.8% of units represented by formula $X^2SiO_{3/2}$, $X^2R^MSiO_{2/2}$, and/or $X^2R^M_2SiO_{1/2}$ where $R^M$ and $X^2$ are as described above.

Alternatively, the polyorganosilicate resin may have terminal aliphatically unsaturated groups ($R^3$). The polyorganosilicate resin having terminal aliphatically unsaturated groups may be prepared by reacting the product of Daudt, et al. with an unsaturated organic group-containing endblocking agent and (optionally) an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare such resin.

When prepared, the polyorganosilicate resin comprises the units described above, and the polyorganosiloxane further comprises the units with silanol (silicon bonded hydroxyl) groups and may comprise neopentamer of formula $Si(OSiR^M_3)_4$, where $R^M$ is as described above. $Si^{29}$ Nuclear Magnetic Resonance (NMR) spectroscopy, as described in U.S. Pat. No. 9,593,209 at col. 32, Reference Example 2, may be used to measure molar ratio of M and Q units, where said ratio is expressed as {M(resin)+(M(neopentamer)}/{Q(resin)+Q(neopentamer)} and represents the molar ratio of the total number of triorganosiloxy groups of the resinous and neopentamer portions of the polyorganosilicate resin to the total number of silicate groups (Q units) in the resinous and neopentamer portions.

The Mn of the polyorganosilicate resin depends on various factors including the types of hydrocarbyl groups represented by $R^M$ that are present. The Mn of the polyorganosilicate resin refers to the number average molecular weight measured using gel permeation chromatography (GPC) according to the procedure in U.S. Pat. No. 9,593,209 at col. 31, Reference Example 1, when the peak representing the neopentamer is excluded from the measurement. The Mn of the polyorganosilicate resin may be 1,500 g/mol to 5,000 g/mol.

Methods for the preparation of (meth)acryloxy-functional polyorganosilicate resin containing D' and T' units above suitable for use as component (B), such as hydrolytic or non-hydrolytic condensation or equilibration of polyorganosilicate resins reacting with (meth)acryloxy-functional alkoxysilane or halosilane under acidic or basic condition; and such as condensation or equilibration following co-hydrolysis of typical organohalosilanes or organoalkoxysilanes with (meth)acryloxy-functional alkoxysilane or halosilane, will be known to those skilled in the art as similar methods for the preparation of organo-functional polyorganosilicate were described in U.S. Pat. No. 8,377,634 to Albaugh, U.S. Pat. No. 5,516,858 to Morita et al, U.S. Pat. No. 9,023,433 to Fu et al, U.S. Pat. No. 6,281,285 to Becker et al. and, U.S. Pat. No. 5,010,159 to Bank et al, and. (Meth)acryloxy-functional alkoxysilane or halosilane can be selected from 3-(chlorodimethylsilyl)propyl methacrylate (CAS #24636-31-5), 3-[dimethoxy(methyl)silyl]propyl methacrylate (CAS #14513-34-9), methacryloxypropylmethyldichlorosilane (CAS #18301-56-9), (3-acryloxypropyl) methyldichlorosilane (CAS #71550-63-5), 3-[dimethoxy (methyl)silyl]propyl acrylate (CAS #13732-00-8), 3-(trimethoxysilyl)propyl acrylate (CAS #4369-14-6), 3-[diethoxy(methyl)silyl]propyl Methacrylate (CAS #65100-04-1), 3-(trimethoxysilyl)propyl Methacrylate (CAS #2530-85-0), 3-(triethoxysilyl)propyl methacrylate (CAS #21142-29-0), methacryloxypropyltrichlorosilane (CAS #7351-61-3), (3-acryloxypropyl)trichlorosilane (CAS #38595-89-0).

Another method for the preparation of (meth)acryloxy-functional polyorganosilicate resin containing M''' suitable for use as starting material (B), such as hydrosilylation reaction between hydrosilyl (—SiH) functional polyorganosilicate and (meth)acryl functional alkene or alkyne; or between alkenyl functional polyorganosilicate and (meth) acryl functional hydrosilane, as descried in U.S. Pat. No. 4,503,208 to Lin et al, "Macromolecular Materials and Engineering" by Hung-Wen et al, Vol. 292, Issue 5, page 666-673 (2007). (Meth)acryl functional alkene or alkyne can be selected from allyl methacrylate (CAS #96-05-9) and propargyl acrylate (CAS #10477-47-1). (Meth)acryl functional hydrosilane can be selected from methacryloxypropyltris(dimethylsiloxy)silane (CAS #17096-08-1) and 2-Propenoic acid, 2-methyl-3-(1,1,3,3-tetramethyldisiloxanyl)propylester (CAS #96474-12-3).

(C) Polyorganohydrogensiloxane

Starting material (C) in the silicone hybrid pressure sensitive adhesive composition is a polyorganohydrogensiloxane in an amount sufficient to provide a molar ratio of silicon bonded hydrogen atoms in starting material (C) to reactive groups in starting materials (A) and (B) combined (SiH/reactive group ratio) of 0.3/1 to 2/1, where the reactive groups are $R^2$ and $R^3$ combined, where the polyorganohydrogensiloxane comprises unit formula $M_tM^H_uD_vD^H_wT_xT^H_yQ_z$, where M, D, T, and Q represent units of the formulas shown above, and $M^H$ represents a unit of formula ($HR^1_2SiO_{1/2}$), $D^H$ represents a unit of formula ($HR^1SiO_{2/2}$), $T^H$ represents a unit of formula ($HSiO_{3/2}$), and subscripts t, u, v, w, x, y, and z have values such that t≥0, u≥0, v≥0, w≥0, x≥0, y≥0, z≥0, a quantity (u+w+y) 3, and a quantity (t+u+v+w+x+y+z) is sufficient to give the polyorganohydrogensiloxane a viscosity of 3 mPa·s to 1,000 mPa·s at 25° C., alternatively 5 mPa·s to 500 mPa·s at 25° C.; and where $R^1$ is as described above. Alternatively, the quantity (t+u+v+w+x+y+z) may be 3 to 2,000; alternatively 3 to 1,000; and alternatively 3 to 500. Alternatively, when subscript x=y=z=0, the polyorganohydrogensiloxane may comprise unit formula $M_tM^H_uD_vD^H_w$, where a quantity (t+u)=2, and a quantity (u+w)≥3. Alternatively, the SiH/reactive group ratio may be 0.4/1 to <1/1, and alternatively 0.5/1 to 0.9/1.

Polyorganohydrogensiloxanes for starting material (C) are exemplified by: Ci) dimethylhydrogensiloxy-terminated poly(dimethylsiloxane/methylhydrogensiloxane), Cii) dimethylhydrogensiloxy-terminated polymethylhydrogensiloxane, Ciii) trimethylsiloxy-terminated poly(dimethylsiloxane/methylhydrogensiloxane), Civ) trimethylsiloxy-terminated polymethylhydrogensiloxane, and Cv) a combination of two or more of Ci) to Civ).

Methods of preparing polyorganohydrogensiloxanes suitable for use as starting material (C), such as hydrolysis and condensation of organohalosilanes, are well known in the art. Furthermore, polyorganohydrogensiloxanes are known in the art and are commercially available, e.g., from Dow Silicones Corporation of Midland, Mich., USA.

(D) Hydrosilylation Reaction Catalyst

Starting material (D) in the silicone hybrid pressure sensitive adhesive composition is a hydrosilylation reaction catalyst. Hydrosilylation reaction catalysts include platinum group metal catalysts. For example, the hydrosilylation reaction catalyst can be Di) a metal selected from platinum, rhodium, ruthenium, palladium, osmium, and iridium. Alternatively, the hydrosilylation reaction catalyst may be Dii) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride; or Diii) a complex of such a compound with a low molecular weight organopolysiloxane. Alternatively, the hydrosilylation reaction catalyst may be Div) the compound microencapsulated in a matrix or core/shell type structure. For example, complexes of platinum with low molecular weight organopolysiloxanes include 1,3-diethenyl-1,1,3,3-tetramethyldisiloxane complexes with platinum (Karstedt's Catalyst). Alternatively, the hydrosilylation reaction catalyst may be Dv) the complex microencapsulated in a resin matrix. Exemplary hydrosilylation reaction catalysts are described in U.S. Pat. Nos. 3,159,601; 3,220,972; 3,296,291; 3,419,593; 3,516,946; 3,814,730; 3,989,668; 4,766,176; 4,784,879; 5,017,654; 5,036,117; and 5,175,325 and EP 0 347 895 B. Suitable hydrosilylation reaction catalysts are known in the art and are commercially available. For example, SYL-OFF™ 4000 Catalyst and SYL-OFF™ 2700 are available from Dow Silicones Corporation of Midland, Mich., USA.

The amount of catalyst used herein will depend on various factors including the selection of starting materials A), B), and C) and their respective contents of aliphatically unsaturated monovalent hydrocarbon groups and silicon bonded hydrogen atoms, and whether an inhibitor is present, however, the amount of catalyst is sufficient to catalyze hydrosilylation reaction of SiH and aliphatically unsaturated monovalent hydrocarbon groups, alternatively the amount of catalyst is sufficient to provide 1 ppm to 1000 ppm of the platinum group metal based on combined weights of all starting materials in the silicone hybrid pressure sensitive adhesive composition; alternatively 2 ppm to 500 ppm, and alternatively 10 ppm to 100 ppm, on the same basis.

(E) Photoradical Initiator

Starting material (E) in the silicone hybrid pressure sensitive adhesive composition is a photoradical initiator. Suitable photoradical initiators include UV initiators such as benzophenone derivatives, acetophenone derivatives (α-hydroxy ketone), benzoin and its alkyl esters, phosphine oxide derivatives, xanthone derivatives, oxime ester derivatives, and camphor quinone. Photoradical initiators are commercially available. For example, photoradical initiators suitable for use herein include 2,6-bis(4-azido benzylidene)cyclohexanone, 2,6-bis(4-azido benzylidene)-4-methylcyclohexanone, 1-hydroxy-cyclohexyl-phenyl-ketone (IRGACURE™ 184), 2-methyl-1[4-(methylthio)phenyl]-2-morpholinopropane-1-one (IRGACURE™ 907); 2-hydroxy-2-methyl-1-phenyl-propane-1-one (DAROCUR™ 1173); a mixed initiator (IRGACURE™ 500) of 50% of IRGACURE™ 184C and 50% of benzophenone; a mixed initiator (IRGACURE™ 1000) of 20% of IRGACURE™ 184C and 80% of DAROCUR™ 1173; 2-hydroxy-1-[4-(2-hydroxyethoxy)phenyl]-2-methyl-1-propanone (IRGACURE™ 2959); methylbenzoylformate (DAROCUR™ MBF); alpha, alpha-dimethoxy-alpha-phenylacetophenone (IRGACURE™ 651); 2-benzyl-2-(dimethylamino)-1-[4-(4-morpholinyl)phenyl]-1-butanone (IRGACURE™ 369); a mixed initiator (IRGACURE™ 1300) of 30% of IRGACURE™ 369 and 70% of IRGACURE™ 651; Diphenyl(2,4,6-trimethylbenzoyl)phosphine oxide (IRGACURE™ TPO), Ethyl (2,4,6-trimethylbenzoyl) phenyl phosphinate (IRGACURE™ TPO-L), propriety oxime ester compounds (N-1919, NCI-831, NCI-930, NCI-730, and NCI-100 supplied from Adeka Corporation), thioxanthen-9-one; 10-methylphenothiazine; isopropyl-9H-thioxanthen-9-one; 2,4-diethyl-9H-thioxanthen-9-one; 2-chlorothioxanthen-9-one; 1-chloro-4-propoxy-9H-thioxanthen-9-one; or a combination of two or more thereof. The photoradical initiators with the DAROCUR™ and IRGACURE™ brands are commercially available from BASF SE of Ludwigshafen, Germany. Alternatively, the photoradical initiator may be selected from the group consisting of Ei) benzophenone, Eii) a substituted benzophenone compound, Eiii) acetophenone, Eiv) a substituted acetophenone compound, Ev) benzoin, Evi) an alkyl ester of benzoin, Evii) a substituted phosphine oxide compound, Eviii) xanthone, and Eix) a substituted xanthone; and Ex) a combination of two or more of Ei) to Eviii). Alternatively, the photoradical initiator may be a substituted acetophenone, such as 1-hydroxycyclohexyl phenyl ketone. The type of photoradical initiator is not specifically restricted, however, some photoradical initiator, especially those containing thioether group, phosphinate, or phosphine oxide group, may inhibit the hydrosilylation reaction catalyst, therefore, when such a photoradical initiator will be included, the appropriate amount of (D) hydrosilylation reaction catalyst and (I) the additive may need to be controlled and/or cure temperature/time may be adjusted.

The amount of photoinitiator in the silicone hybrid pressure sensitive adhesive composition will depend on various factors including the desired reaction rate, the photoinitiator used, and the selection and amount of starting materials (A) and (B) and their respective contents of (meth)acryloxyalkyl groups, however, the amount may be 1 part by weight to 20 parts by weight, per 100 parts by weight of starting material (A). Alternatively, the amount of photoinitiator may be 0.1 weight % to 10 weight %, alternatively 0.5 weight % to 5 weight %, based on combined weights of starting materials (A), (B), and (C) in the composition.

(F) Hydrosilylation Reaction Inhibitor

Starting material (F) in the silicone hybrid pressure sensitive adhesive composition is a hydrosilylation reaction inhibitor (inhibitor) that may optionally be used for altering rate of reaction of the silicon bonded hydrogen atoms and the aliphatically unsaturated hydrocarbon groups of starting materials (A), (B), and (C), as compared to reaction rate of the same starting materials but with the inhibitor omitted. Inhibitors are exemplified by acetylenic alcohols such as dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol (ETCH), and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; fumarates including dialkyl fumarates such as diethyl fumarate and/or dialkenyl fumarates such as diallyl fumarate and/or dialkoxyalkyl fumarates, maleates such as diallyl maleate and diethyl maleate; nitriles; ethers; carbon monoxide; alkenes such as cyclo-octadiene, divinyltetramethyldisiloxane; alcohols such as benzyl alcohol; and a combination thereof.

Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the silylated acetylenic compound is exemplified by methyl(tris(1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,740 discloses silylating an acetylenic alcohol described above by reacting it with a chlorosilane in the presence of an acid receptor. Alternatively, the hydrosilylation reaction inhibitor may be selected from the group consisting of acetylenic alcohols, cycloalkenylsiloxanes, ene-yne compounds, triazoles, phosphines, mercaptans, hydrazines, amines, fumarates, maleates, nitriles, ethers, carbon monoxide, alcohols, and silylated acetylenic alcohols. Alternatively, the hydrosilylation reaction inhibitor may be an acetylenic alcohol, such as ETCH.

The amount of inhibitor used herein will depend on various factors including the desired reaction rate, the particular inhibitor used, and the selection and amount of starting materials (A), (B), and (C). However, when present, the amount of inhibitor may be 0.1 part by weight to 4 parts by weight, per 100 parts by weight of starting material (A). Alternatively, the amount of inhibitor may be 0.0001 weight % to 1 weight %, based on combined weights of starting materials (A), (B), and (C) in composition.

(G) Free Radical Scavenger

Starting material (G) is a free radical scavenger (scavenger) that may be used to control or inhibit a radical reaction of the silicone hybrid pressure sensitive adhesive composition. Because the silicone hybrid pressure sensitive adhesive composition comprises reactive (meth)acrylate groups, a viable free radical scavenger may be present to prevent premature reaction, for example, in storage and during use of the protective film prepared using the silicone hybrid pressure sensitive adhesive composition. Scavengers comprising phenolic compounds are one class of such materials that may be used in the invention, including, for example, 4-methoxyphenol (MEHQ, methyl ether of hydroquinone), hydroquinone, 2-methylhydroquinone, 2-t-butylhydroquinone, t-butyl catechol, butylated hydroxy toluene, and butylated hydroxy anisole, combinations of two or more thereof. Other scavengers that may be used include phenothiazine and anaerobic inhibitors, such as the NPAL type inhibitors (tris-(N-nitroso-N-phenylhydroxylamine) aluminum salt) from Albemarle Corporation, Baton Rouge, La. Alternatively, the free radical scavenger may be selected from the group consisting of a phenolic compound, phenothiazine and an anaerobic inhibitor.

Free radical scavengers are known, for example, in U.S. Pat. No. 9,475,968, and are commercially available. The amount of scavenger in the silicone hybrid pressure sensitive adhesive composition will depend on various factors including the type and amount of (meth)acryloxyalkyl groups in starting materials (A) and (B), however the scavenger may be present in an amount of 0.001 part by weight to 1 part by weight, per 100 parts by weight of starting material (A). Alternatively, the amount of scavenger may be 0.001 parts by weight to 0.5 parts by weight, alternatively 0.01 parts by weight to 0.1 parts by weight, based on combined weights of all starting materials in the composition.

(H) Solvent

Starting material (H) in the silicone hybrid pressure sensitive adhesive composition is a solvent. The solvent may be added during preparation of the silicone hybrid pressure sensitive adhesive composition, for example, to aid mixing and delivery of one or more starting materials when preparing the silicone hybrid pressure sensitive adhesive composition and/or to facilitate coating the silicone hybrid pressure sensitive adhesive composition on a substrate, as described hereinbelow. When preparing the silicone hybrid pressure sensitive adhesive composition, certain starting materials may be delivered in solvent, such as the polyorganosilicate resin and/or the hydrosilylation reaction catalyst. Suitable solvents include organic liquids exemplified by, but not limited to, aromatic hydrocarbons, aliphatic hydrocarbons, ketones, esters, ethers, glycols, and glycol ethers. Hydrocarbons include benzene, toluene, xylene, naphtha, hexane, cyclohexane, methylcyclohexane, heptane, octane, decane, hexadecane, isoparaffin such as Isopar L (C11-C13), Isopar H(C11-C12), hydrogenated polydecene. Suitable ketones include, but are not limited to, acetone, methylethyl ketone, 2-pentanone, 3-pentanone, 2-hexanone, 2-heptanone, 4-heptanone, methyl isobutyl ketone, diisobutylketone, acetonylacetone, and cyclohexanone. Esters include ethyl acetate, propyl acetate, isopropyl acetate, butyl acetate, and isobutyl acetate Ethers include diethyl ether, dipropyl ether, diisopropyl ether, dibutyl ether, 1,2-dimethoxyethane, and 1,4-dioxane. Solvents having both ester and ether moieties include 2-methoxyethyl acetate, 2-ethoxyethyl acetate, propylene glycol monomethyl ether acetate, and 2-butoxyethyl acetate; Ethers and esters further include, isodecyl neopentanoate, neopentylglycol heptanoate, glycol distearate, dicaprylyl carbonate, diethylhexyl carbonate, propylene glycol n-propyl ether, propylene glycol-n-butyl ether, ethyl-3 ethoxypropionate, propylene glycol methyl ether acetate, tridecyl neopentanoate, propylene glycol methylether acetate (PGMEA), propylene glycol methylether (PGME), dipropylene glycol methyl ether, or ethylene glycol n-butyl ether, octyldodecyl neopentanoate, diisobutyl adipate, diisopropyl adipate, propylene glycol dicaprylate/dicaprate, octyl ether, and octyl palmitate. Alternatively, the solvent may be selected from polyalkylsiloxanes, ketones, glycol ethers, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane, octamethylcyclotetrasiloxane, decamethylcyclopentasiloxane, tris(trimethylsiloxy)methylsilane, tetrakis(trimethylsiloxy)silane, dodecamethylcyclohexasiloxane, octamethyltrisiloxane, decamethyltetrasiloxane, dodecamethylpentasiloxane, tetradecamethylhexasiloxane, hexadecamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane, and combinations thereof. Low molecular weight polyalkylsiloxanes, such as 0.5 to 1.5 cSt polydimethylsiloxanes are known in the art and commercially available as DOWSIL™ 200 Fluids and DOWSIL™ OS FLUIDS, which are commercially available from Dow Silicones Corporation. Alternatively, the solvent may be selected from the group consisting of an aliphatic hydrocarbon, an aromatic hydrocarbon, an ether, an ester, and a solvent having both ether and ester moieties.

The amount of solvent will depend on various factors including the type of solvent selected and the amount and type of other starting materials selected. However, when present, the amount of solvent may be 20 parts by weight to 300 parts by weight, per 100 parts by weight of starting material (A). Alternatively, the amount of solvent may be 10 weight % to 80 weight %, based on combined weights of starting materials (A), (B), and (C) in composition.

(I) Additive

The silicone hybrid pressure sensitive adhesive composition may optionally further comprise an additive, such as Ii) a synergist, Iii) a chain transfer agent (a hydrogen donor), Iiii) a sensitizer, a combination of two or more of additives Ii) to Iv). The additive described above may help to improve UV sensitivity, and may reduce one or more of oxygen inhibition and adhesive force of the silicone hybrid pressure sensitive adhesive when exposed to UV radiation. Suitable type of additives are summarized in "*The formulator's guide to anti-oxygen inhibition additives.*" *Progress in Organic Coatings* 77.11 (2014): 1789-1798 by Husár, Branislav, et al. and PCT Publication WO2017182638A1. The type of additive is not specifically restricted, however, some additives, especially those containing mercpato group, phosphine, or phosphine oxide group, may inhibit the hydrosilylation reaction catalyst, therefore, when such an additive will be included, the appropriate amount of (D) hydrosilylation reaction catalyst and (1) the additive need to be controlled and/or cure temperature/time is needed to be adjusted. The amount of additive may be 0 to 5 parts by weight, per 100 parts by weight of starting material (A). Alternatively, the amount of additive may be 0 to 5 weight %, alternatively 0 to 2 weight %, based on combined weights of starting materials (A), (B), and (C) in composition. Examples of commercially available additives are below.

The synergist may be selected from amine-containing compounds consisting of tertiary amine, glycine, oxime, aminobenzoates, acrylated amines, amine modified acrylates, and a combination of at least two of these synergists. Examples of tertiary amine, and aminobenzoates are commercially available and include, but are not limited to, N-methyl diethanolamine (CAS #105-59-9; Sigma-Aldrich), p-tolyldiethanolamine (CAS #3077-12-1), n-ethyldiisopropylamine (CAS #7087-68-5, Sigma-Aldrich), 2-(diisopropylamino)ethanol (CAS #96-80-0, Sigma-Aldrich), N-phenyl glycine (CAS #103-01-5, TCI), Speed Cure PDO (Lambson), ethyl 4-(dimethylamino)benzoate (CAS #10287-53-3, TCI), 2-ethylhexyl 4-(dimethylamino)benzoate (CAS #21245-2-3), Speedcure EDB (Lamson), Speedcure DMB (Lamson), Speedcure EHA (Lamson), Speedcure BDMB (Lamson), Speedcure XFLM01 (Lamson), Speedcure XFLM02 (Lamson), Speedcure EMD (Lamson), Speedcure BEDB (Lamson), Speedcure 7040 (Lamson), Speedcure EPD (Lamson), Dimethylamine borane (CAS #74-94-2 Sigma-Aldrich), N-vinyl pyrrolidone (BASF). Examples of amine modified acrylates and acrylated amines are also commercially available and include, but are not limited to, 2-(dimethylamino)ethyl methacrylate (CAS #2867-47-2, TCI), 2-(dimethylamino)ethyl acrylate (CAS #2439-35-2, TCI), N-[3-(Dimethylamino)propyl]acrylamide (CAS #3845-76-9, TCI), Ebecryl P115 (Allnex), Ebecryl 7100 (Allnex), Ebecryl 80 (Allnex), Ebecryl 81 (Allnex), Ebecryl 83 (Allnex), Ebecryl 85 (Allnex), Ebecryl 880 (Allnex), Ebecryl LE010551 (Allnex), Ebecryl LE010552 (Allnex), Ebecryl LE010553 (Allnex), Ebecryl 3600 (Allnex), Ebecryl 3703 (Allnex), DEAEMA (BASF). DMAEMA (BASF), TBAEMA (BASF), Genomer 5271 (Rahn), Genomer 5142 (Rahn), Genomer 5161 (Rahn), Genomer 5275 (Rahn), CN UVA 421 (Sartomer), CN3702 (Sartomer), CN3715 (Sartomer), CN3715 LM (Sartomer), CN3755 (Sartomer), CN381 (Sartomer), CN 386 (Sartomer), CN501 (Sartomer), The amount of the synergist can be 0.01 part by weight to 10 parts by weight, alternatively 0.1 part to 2.0 part, per 1 part by weight of the photoinitiator (E).

The chain transfer agent may be selected from mercapto-containing compounds and any other hydrogen donors. Examples of pentaerythritol tetrakis(3-mercaptopropionate) (CAS #7575-23-7; Sigma-Aldrich), trimethylolpropane tris (3-mercaptopropionate) (CAS #33007-83-9; Sigma-Aldrich), tris(trimethyl silyl)silane (CAS #1873-77-4, Alfa Aesar), 3-mercaptopropyl(dimethoxy)methylsilane (CAS #31001-77-1; TCI), (3-Mercaptopropyl)trimethoxysilane (CAS #4420-74-0; TCI), mercaptosiloxane (CAS102783-03-9; Gelest), and 1-hexanthiol (CAS #111-31-9, Sigma-Aldrich). The amount of the chain transfer agent can be 0.01 part by weight to 10 parts by weight, alternatively 0.1 part to 2.0 part, per 1 part by weight of the photoinitiator (E).

Alternatively, the synergist may be a sensitizer, such as those disclosed in PCT Publication WO2015194654A1 and U.S. Pat. No. 4,250,053. Useful sensitizers include 2-isopropylthioxanthone, 1,3-diphenyl-2-pyrazoline, and 1,3-diphenylisobenzofuran. Other examples of the sensitizer include anthracene compounds, 4-methoxy-1-naphthol, fluorene, pyrene, and stilbene. Examples of the anthracene compound include anthracene, 9,10-dimethoxyanthracene, 9,10-diethoxyanthracene, 9,10-dipropoxyanthracene, 2-ethyl-9,10-dimethoxyanthracene, 2-ethyl-9,10-Diethoxyanthracene, 2-ethyl-9,10-dipropoxyanthracene, 4'-nitrobenzyl-9,10-dimethoxyanthracene-2-sulfonate, 4'-nitrobenzyl-9,10-diethoxyanthracene-2-sulfonate and 4'-nitrobenzyl-9,10-dipropoxyanthracene-2-sulfonate. Sensitizers are commercially available, e.g., under the tradename Anthracure UVS-1331, 1221, 1101, and ET-2111 (manufactured by Kawasaki Kasei Kogyo Co., Ltd.). The amount of the sensitizer can be 0.01 part by weight to 10 parts by weight, alternatively 0.1 part to 2.0 part, per 1 part by weight of the photoinitiator (E).

(J) Bis-SiH-Terminated Polydiorganosiloxane

Optionally, a bis-SiH-terminated polydiorganosiloxane may be used in addition to starting material (C) in the silicone hybrid pressure sensitive adhesive composition.

This polydiorganosiloxane may have unit formula $M^H_2 D_k$, where $M^H$ and D units are as described above, and subscript $k \geq 1$, alternatively $1 \leq k \leq 500$. Suitable polydiorganosiloxanes for starting material (J) include dimethylhydrogensiloxy-terminated polydimethylsiloxanes and dimethylhydrogensiloxy-terminated polydiphenylsiloxanes. When present, the weight ratio of starting material (J) to starting material (C) [(J)/(C) ratio] may be 0.25/1 to 4/1.

When selecting starting materials for the silicone hybrid pressure sensitive adhesive composition described above, there may be overlap between types of starting materials because certain starting materials described herein may have more than one function. For example, certain reducing agents may also function as hydrosilylation reaction inhibitors (e.g., phosphines such as triphenyl phosphine). When adding additional starting materials to the silicone hybrid pressure sensitive adhesive composition, the additional starting materials are distinct from one another and from the required starting materials in the silicone hybrid pressure sensitive adhesive composition.

Method for Preparing the Silicone Hybrid Pressure Sensitive Adhesive Composition The silicone hybrid pressure sensitive adhesive composition can be prepared by a method comprising combining all starting materials by any convenient means such as mixing at ambient or elevated temperature. The hydrosilylation reaction inhibitor may be added before the hydrosilylation reaction catalyst, for example, when the silicone hybrid pressure sensitive adhesive composition will be prepared at elevated temperature and/or the silicone hybrid pressure sensitive adhesive composition will be prepared as a one part composition.

Alternatively, the silicone hybrid pressure sensitive composition may be prepared as a multiple part composition, for example, when the silicone hybrid pressure sensitive adhesive composition will be stored for a long period of time before use. In the multiple part composition, the hydrosilylation reaction catalyst is stored in a separate part from any starting material having a silicon bonded hydrogen atom, for example the polyorganohydrogensiloxane, and the parts are combined shortly before use of the silicone hybrid pressure sensitive adhesive composition. For example, a two part composition may be prepared by combining starting materials comprising starting material (C) the polyorganohydrogensiloxane, all or a portion of starting materials (A) and (B), and optionally all or a portion of (H) the solvent, and optionally one or more other additional starting materials described above to form a base part, by any convenient means such as mixing. A curing agent may be prepared by combining starting materials comprising starting materials (D) the hydrosilylation reaction catalyst and all or a portion of starting materials (A) and (H), and optionally one or more other additional starting materials described above by any convenient means such as mixing. The starting materials may be combined at ambient or elevated temperature. Starting material (F) the hydrosilylation reaction inhibitor may be included in one or more of the base part, the curing agent part, or a separate additional part. Starting material (B), the polyorganosilicate resin, may be added to the base part, the curing agent part, or a separate additional part. Starting material (E), the photoradical initiator, and starting material (G), the free radical scavenger, may be added to the base part or a separate additional part. When a two part composition is used, the weight ratio of amounts of base part to curing agent part may range from 1:1 to 10:1. The silicone hybrid pressure sensitive adhesive composition will cure via hydrosilylation reaction to form a pressure sensitive adhesive.

Preparation of an Adhesive Article

The method described above may further comprise one or more additional steps. The silicone hybrid pressure sensitive adhesive composition prepared as described above may be used to form an adhesive article, e.g., a pressure sensitive adhesive (prepared by thermal cure of the silicone hybrid pressure sensitive adhesive composition described above) on a surface of a substrate. The method described above may, therefore, further comprises applying the silicone hybrid pressure sensitive adhesive composition to a substrate.

Applying the pressure sensitive adhesive curable composition to the substrate can be performed by any convenient means. For example, the pressure sensitive adhesive curable composition may be applied onto a substrate by spin coater, gravure coater, offset coater, offset-gravure coater, roller coater, reverse-roller coater, air-knife coater, or curtain coater.

The substrate can be any material that can withstand the curing conditions (described below) used to cure the pressure sensitive adhesive curable composition to form the pressure sensitive adhesive on the substrate. For example, any substrate that can withstand heat treatment at a temperature equal to or greater than 120° C., alternatively 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), or polyethylene terephthalate (PET), or PE (polyethylene), or PP (polypropylene). The thickness of the substrate is not critical, however, the thickness may range from 25 micrometers to 300 micrometers. The substrate is preferably transparent, alternatively, substrates may be used that allow the silicone hybrid pressure sensitive adhesive to be exposed to UV radiation.

To improve bonding of the silicone hybrid pressure sensitive adhesive to the substrate, the method may optionally further comprise treating the surface of the substrate before applying the silicone hybrid pressure sensitive adhesive composition. Treating the substrate may be performed by any convenient means, such as applying a primer, or subjecting the substrate to corona-discharge treatment, etching, or plasma treatment before applying the pressure sensitive adhesive composition to the substrate.

An adhesive article, such as a protective film, may be prepared by applying the silicone hybrid pressure sensitive adhesive composition described above onto the surface of the substrate described above. The method may optionally further comprise removing the all, or a portion, of the solvent before and/or during curing. Removing solvent may be performed by any convenient means, such as heating at a temperature that vaporizes the solvent without fully curing the silicone hybrid pressure sensitive adhesive composition via hydrosilylation reaction, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes). The method then further comprises curing the silicone hybrid pressure sensitive adhesive composition (which may have some or all of the solvent removed when the drying step is performed) via hydrosilylation reaction at room temperature or by heating at a temperature of 60° C. to 220° C., alternatively 70° C. to 200° C., alternatively 80° C. to 180° C., and alternatively 120° C. to 160° C. for a time sufficient to form the silicone hybrid pressure sensitive adhesive on the surface of the substrate (e.g., for 30 seconds to an hour, alternatively 1 to 5 minutes). Drying and/or hydrosilylation reaction curing may be performed by placing the substrate in an oven. The amount of the silicone hybrid pressure sensitive adhesive composition to be applied to the substrate depends on the specific application, however, the amount may be sufficient such that after curing thickness of the silicone hybrid pressure sensitive adhesive may be 5 micrometers to 200 micrometers, and for protective film the thickness may be 10 micrometers to 50 micrometers, alternatively 20 micrometers to 40 micrometers, and alternatively 30 micrometers; after cure via hydrosilylation reaction.

Therefore, the method for forming the protective film comprising the silicone hybrid pressure sensitive adhesive layer on a surface of a substrate comprises:

1) optionally treating the surface of the substrate as described above;
2) applying the silicone hybrid pressure sensitive adhesive composition described above to the surface of the substrate, and
3) heating the silicone hybrid pressure sensitive adhesive composition to form the silicone hybrid pressure sensitive adhesive layer on the surface of the substrate.

The method described above may optionally further comprise applying a removable release liner to the silicone hybrid pressure sensitive adhesive layer opposite the substrate, e.g., to protect the silicone hybrid pressure sensitive adhesive before use. The release liner may be removed before use of the adhesive article (e.g., protective film)

The adhesive article (e.g., protective film) prepared as described above is suitable for use in an (opto)electronic device (e.g., flexible OLED display device) fabrication process as a protective film.

The method for fabricating the (opto)electronic device may comprise:

4) applying the protective film prepared as described above to a passivation layer in the device such that the silicone hybrid pressure sensitive adhesive contacts the passivation layer;
5) using the protective film to protect the passivation layer in the device (e.g., during processing and/or transport of the device); and thereafter
6) exposing the protective film to UV radiation; thereby decreasing tack of the silicone hybrid pressure sensitive adhesive. The obtained silicone hybrid pressure sensitive adhesive layer of the cured film above contains a free (meth)acryl group, which can be analyzed by Fourier Transform-Infrared (FT-IR) spectroscopy, and its relative amount of the cured film and its reaction when exposed to UV irradiation could be monitored by the absorption intensity of unsaturated bond's vibration in FT-IR spectrum as illustrated in 'UV coatings: basics, recent developments and new applications', at page 33 (Elsevier; 2006 Dec. 21) to Schwalm; Polymer Chemistry. 2013; 4(8):2449-56 to Espeel. The free (meth)acryl group in the prepared silicone hybrid sensitive adhesive by using starting material (A) was detected at around 1296 $cm^{-1}$ and 938 $cm^{-1}$. Without wishing to be bound by theory, it is thought that exposure to UV radiation causes the (meth)acryloxyalkyl groups $R^2$ to further react and further crosslink, thereby decreasing tack of the silicone hybrid pressure sensitive adhesive, which can permit removal of the protective film from the passivation layer in the device while minimizing damage to the passivation layer and/or minimizing residual silicone hybrid pressure sensitive adhesive being left on the passivation layer.

Exposing the protective film to UV radiation step can be performed using a general ultraviolet irradiation apparatus, for example, a face type or a conveyer belt-type ultraviolet irradiation apparatus, where a low-pressure mercury lamp, a medium-pressure mercury lamp, a high-pressure mercury lamp, an ultrahigh-pressure mercury lamp, a xenon lamp, a metal halide lamp, an electrodeless lamp, an ultraviolet light-emitting diodes or the like is used as the light source. The ultraviolet irradiation dose is generally from 0.1 $W/cm^2$ to 5 $W/cm^2$ for 5 seconds to 60 seconds (=0.5 $J/cm^2$ to 300 $J/cm^2$). If the adherend, such as an optoelectronic device is sensitive and can be damaged by heat or light generated from UV lamps, an ultraviolet light-emitting diode may be used, and the practical dose may be 0.5 $J/cm^2$ to less than 10 $J/cm^2$. Alternatively, exposing to UV radiation may be performed by any convenient means, such as those disclosed in U.S. Patent Application Publication 2002/0071958A1 and Korean Patent 101704548B1. Alternatively, the method described below in Reference Example 8 may be used.

EXAMPLES

These examples are intended to illustrate some embodiments of the invention and should not be interpreted as limiting the scope of the invention set forth in the claims. Starting materials used in these examples are described in Table 1.

TABLE 1

Starting Materials Used in the Examples

| Starting Material | Chemical Description | Source |
|---|---|---|
| DOWSIL™ Z-6033 | 3-methacryloxypropylmethyldimethoxysilane (CAS#14513-34-9) | Dow Silicones |
| OH Fluid | bis-hydroxyl-terminated polydimethylsiloxane with DP of 30 (CAS#70131-67-8) | Dow Silicones |
| ME2/MeVi Diol | bis-hydroxy-terminated poly(dimethyl, methylvinyl)siloxane with DP of ~10 (CAS#67923-19-7) | Dow Silicones |
| End-Block | bis-dimethylvinylsiloxy-terminated polydimethylsiloxane CAS#68083-19-2 | Dow Silicones |
| Phosphazene Catalyst | partially hydrolysed dichlorophosphazene oligomer (CAS# 1391992-23-6) | Dow Silicones |
| DVTMDZ | 1,3-Divinyl-1,1,3,3-tetramethyldisilazane (CAS# 7691-02-3) | Sigma-Aldrich |
| HMDZ | Bis(trimethylsilyl)amine (CAS#999-97-3) | Dow Silicones |
| A-1 | 75% Bis-vinyldimethylsiloxy-terminated (methacryloxypropyl)methylsiloxane - dimethylsiloxane copolymer in toluene, DP = 2188, m/n Ratio = 37/1 [Ma Content = 0.343 mmol/g, Vi Content = 0.012, Total reactive group = 0.355 in solid] | See Reference Example 1 for Synthesis |

TABLE 1-continued

Starting Materials Used in the Examples

| Starting Material | Chemical Description | Source |
|---|---|---|
| A-2 | 75% Bis-vinyldimethylsiloxy-terminated (methacryloxypropyl)methylsiloxane - dimethylsiloxane copolymer in toluene, DP = 5710, m/n Ratio = 56/1 [Ma Content = 0.230 mmol/g, Vi Content = 0.005 mmol/g, Total Reactive group = 0.235 mmol/g in solid] | See Reference Example 2 for Synthesis |
| A-3 | 75% Bis-vinyldimethylsiloxy-terminated (methacryloxypropyl)methylsiloxane - dimethylsiloxane copolymer in toluene, DP = 2689, m/n Ratio = 260/1 [Ma Content = 0.051 mmol/g, Vi Content = 0.010 mmol/g, Total Reactive group = 0.061 mmol/g in solid] | See Reference Example 3 for Synthesis |
| A-4 | 75% Bis-vinyldimethylsiloxy-terminated (methacryloxypropyl)methylsiloxane - dimethylsiloxane copolymer in toluene, DP = 2815, m/n Ratio = 20/1 [Ma Content = 0.604 mmol/g, Vi Content = 0.009 mmol/g, Total Reactive group = 0.613 mmol/g in solid] | See Reference Example 4 for Synthesis |
| A-5 | 75% Bis-vinyldimethylsiloxy-terminated (methacryloxypropyl)methylsiloxane - dimethylsiloxane copolymer in toluene, DP = 2560, m/n Ratio = 521/1 [Ma Content = 0.026 mmol/g, Vi Content = 0.010 mmol/g, Total Reactive group = 0.037 mmol/g in Solid] | See Reference Example 5 for Synthesis |
| A-6 | Bis-trimethylsiloxy-terminated (methacryloxypropyl)methylsiloxane - dimethylsiloxane - vinylmethylsiloxane copolymer, DP = 288, (m + o)/n Ratio = 31/1 [Methacryl Content = 0.339 mmol/g, Vi Content = 0.106 mmol/g, Total Reactive group = 0.505 mmol/g] | See Reference Example 7 for Synthesis |
| A'-7 | 30% of Vinyl-terminated polydimethylsiloxane in toluene (CAS#68083-19-2), DP = 9,461: Vi content = 0.0044 mmol/g in solid | Dow Chemical Silicones DOWSIL ™ 7637 Adhesive |
| A'-8 | 25% (methylhexenylsiloxane)-dimethylsiloxane copolymer (CAS#144669-05-6) in toluene,: Vi content = 0.2889 mmol/g in solid | Dow Silicones |
| B-1 | 75% Silicic acid, sodium salt, reaction products with chlorotrimethylsilane and iso-Pr alcohol, in xylene (CAS# 68988-56-7) | Dow Silicones DOWSIL ™ |
| B-2 | 75% Dimethylvinylated and trimethylated silica in xylene (CAS#68988-89-6) [Vi content = 0.703 mmol/g in solid, Total Reactive Group = 0.703 mmol/g] | Dow Chemical Silicones DOWSIL ™ 6-3444 Int |
| B-3 | 68.4% Methacryloxypropyl(methyl)ated, Dimethylvinylated and trimethylated silica in toluene/xylene [Methacryl Content = 0.332 mmol/g, Vi Content = 0.532 mmol/g, Total Reactive group = 0.864 mmol/g] | See Reference Example 6 for Synthesis |
| B'-4 | 75% Methacryloxypropyl(methyl)ated, and trimethylated silica in xylene (CAS#68988-89-6) [Methacryl content = 0.518 mmol/g in solid, Total Reactive Group = 0.518 mmol/g] | See Reference Example 6 for Synthesis |
| C-1 | Poly(methylhydrosiloxane), trimethylsilyl terminated, SiH = 16 mmol/g, 20 cst (CAS#63148-57-2) | Dow Silicones DOWSIL ™ 7028 Crosslinker |
| C-2 | Poly(dimethylsiloxane-co-methylhydrosiloxane), trimethylsilyl terminated, SiH = 7.6 mmol/g, 30 cst (CAS#68037-59-2) | Dow Silicones DOWSIL ™ 7678 Crosslinker |
| C-3 | Methylhdyrosiloxane-diemthylsiloxane copolymer, hydride terminated, SiH = 4.32 mmol/g, 13 cst (CAS#69013-23-6) | Dow Silicones |
| D-1 | Platinum catalyst (4% Active Pt); Platinum, 1,3-diethenyl-1,1,3,3-tetramethyldisiloxane complexes CAS# 68478-92-2 | Dow Silicones |
| E-1 | IRGACURE ™ 184 (1-Hydroxycyclohexyl phenyl ketone, CAS# 947-19-3) | BASF |
| E-2 | IRGACURE ™ 369 | BASF |
| F-1 ETCH | 1-Ethynyl-1-cyclohexanol CAS# 78-27-3 | Dow Chemical |
| G -1 MEHQ | 4-Methoxyphenol CAS# 150-76-5 | Sigma-Aldrich |
| H-1 | Toluene | Sigma-Aldrich |
| I-1 | N-phenyl glycine (CAS#103-01-5) | TCI |
| I-2 | ethyl 4-(dimethylamino)benzoate (CAS# 10287-53-3) | TCI |
| I-3 | Mercaptosiloxane | Dow Silicones |

Starting materials branded DOWSIL™ and SYL-OFF™ are commercially available from Dow Silicones Corporation.

In this Reference Example 1, a bis-vinyl-terminated poly(dimethyl/methyl,methacryloxypropyl)siloxane copolymer shown as Starting Material A-1 in Table 1, above, was synthesized as follows. To a 4-neck 1 liter round bottom flask 3-methacryloxypropyl methyl dimethoxysilane (50.78 g, DOWSIL™ Z-6033) and 0.1 N HCl (45.45 g) were added and mixed using a magnetic stir bar at ~23° C. Using a simple distillation glassware setup vacuum was pulled to ~20 mmHg for 1.5 hours. After 1.5 hours the vacuum was released and bis-hydroxyl-terminated polydimethylsiloxane (550.00 g, OH FLUID) along with 0.16 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (300 g, Sigma-Aldrich) and bis-dimethylvinylsiloxy-terminated polydimethylsiloxane (2 g, End-blocker) were added. The solution was then heated to 111-115° C., with 0.4 mL of phosphazene catalyst being added at 90° C. The overheads were collected in the Dean Stark trap and an additional 0.4 mL of phosphazene catalyst was added. The solution was held at toluene reflux for 1 hour. The heat was removed, and the solution was cooled. At ~60° C., DVTMDZ (1 g, Sigma Aldrich) was added to the reaction solution and mixed for 2 hours. And, the solution was heated to 120° C. with nitrogen/2% oxygen gas bubbling for 1 hours and cooled to RT with gas bubbling. The solid content of the solution (which was measured the weight before and after drying 150° C. for 1 hour) was adjusted to 75% by adding additional toluene. Then, the product dissolved in toluene was obtained. Based on $^{13}C$- and $^{29}Si$-NMR analysis, the obtained bis-dimethylvinylsiloxy-terminated poly(dimethyl/methyl,methacryloxypropyl) siloxane copolymer comprised the following average unit formula: $(R^4_3SiO_{1/2})_{0.00091}(R^4_2SiO_{2/2})_{0.99909}$; where each $R^4$ was independently selected from methyl, methacryloxypropyl, and vinyl; and the subscripts represented mole fractions. The methacryl content was 1.325 mole % of total $R^4$, the vinyl content was 0.015 mole % of total $R^4$, and the methyl content was 98.660 mole % of total $R^4$. The (m+o)/n ratio is 37/1. [Methacryl Content=0.343 mmol/g, Vi Content=0.012, total reactive group=0.355]. Alternatively, the obtained bis-dimethylvinylsiloxy-terminated poly(dimethyl/methyl,methacryloxypropyl)siloxane copolymer could be shown with the average unit formula $(ViMe_2SiO)_2(MaMeSiO)_{58}(Me_2SiO)_{2130}$.

In this Reference Example 2, a bis-vinyldimethylsiloxy-terminated poly(dimethyl/methyl,methacryloxypropyl)siloxane copolymer shown as Starting Material A-2 in Table 1, above, was synthesized as follows. To a 4-neck 1 liter round bottom flask 3-methacryloxypropyl methyl dimethoxysilane (33.3 g, DOWSIL™ Z-6033) and 0.1 N HCl (45.45 g) were added and mixed using a magnetic stir bar at room temperature (~23° C.). Using a simple distillation glassware setup vacuum was pulled to ~20 mmHg for 1.5 hours. After 1.5 hours the vacuum was released and bis-hydroxyl-terminated polydimethylsiloxane (600.00 g, OH FLUID) along with 0.23 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (300 g, Sigma-Aldrich) and bis-dimethylvinylsiloxy-terminated polydimethylsiloxane (2.2 g, End-blocker) were added. The solution was then heated to 111-115° C., with 0.4 mL of phosphazene catalyst being added at 90° C. The overheads were collected in the Dean Stark trap and an additional 0.4 mL of phosphazene catalyst was added. The solution was held at toluene reflux for 1 hour. The heat was removed, and the solution was cooled. At ~60° C., DVTMDZ (1 g, Sigma Aldrich) was added to the reaction solution and mixed for 2 hours. And, the solution was heated to 120° C. with nitrogen/2% oxygen gas bubbling for 1 hours and cooled to RT with gas bubbling. The solid content of the solution was adjusted to 75% by adding additional toluene. Then, the product dissolved in toluene was obtained. Based on $^{13}C$- and $^{29}Si$-NMR analysis, the obtained bis-vinyldimethylsiloxy-terminated poly(dimethyl/methyl,methacryloxypropyl)siloxane copolymer comprised the following average unit formula: $(R^4_3SiO_{1/2})_{0.00035}(R^4_2SiO_{2/2})_{0.99965}$; where each $R^4$ was independently selected from methyl, methacryloxypropyl, and vinyl; and the subscripts represent mole fractions. The methacryl content was 0.876 mole % of total $R^4$, the vinyl content was 0.006 mole % of total $R^4$, and the methyl content was 99.1187 mole % of total $R^4$. The (m+o)/n ratio is 56/1. [Methacryl Content=0.230 mmol/g, Vi Content=0.005 mmol/g, Total Reactive group=0.235 mmol/g]. Alternatively, the obtained a bis-vinyldimethylsiloxy-terminated poly(dimethyl/methyl, methacryloxypropyl)siloxane copolymer could be shown as: $(ViMe_2SiO)_2(MaMeSiO)_{100}(Me_2SiO)_{5610}$.

In this Reference Example 3, a bis-vinyl-terminated poly (dimethyl/methyl,methacryloxypropyl)siloxane copolymer shown as Starting Material A-3 in Table 1, above, was synthesized as follows. To a 4-neck 1 liter round bottom flask 3-methacryloxypropyl methyl dimethoxysilane (13.7 g, DOWSIL™ Z-6033) and 0.1N HCl (24.37 g) were added and mixed using a magnetic stir bar at ~23° C. Using a simple distillation glassware setup vacuum was pulled to −20 mmHg for 1.5 hours. After 1.5 hours the vacuum was released and bis-hydroxyl-terminated polydimethylsiloxane (1179.49 g, OH FLUID) along with 0.34 g of (G-1) MEHQ were added to the reaction solution. The magnetic stir bar was removed and a Teflon paddle with a glass stir rod was used to mix the solution. Vacuum was pulled to −5 mmHg and the reaction was heated to 80° C. for 1.5 hours. The simple distillation glassware setup was dissembled, and a Dean Stark distillation setup was used for the last reaction step. To the reaction solution, (H-1) toluene (550 g, Sigma-Aldrich) and bis-dimethylvinylsiloxy-terminated polydimethylsiloxane (2.2 g, End-blocker) were added. The solution was then heated to 111-115° C., with 0.1 mL of phosphazene catalyst being added at 90° C. The overheads were collected in the Dean Stark trap and an additional 0.1 mL of phosphazene catalyst was added. The solution was held at toluene reflux for 1 hour. The heat was removed, and the solution was cooled. At ~60° C., DVTMDZ (0.3 g, Sigma Aldrich) was added to the reaction solution and mixed for 2 hours. And, the solution was heated to 120° C. with nitrogen/2% oxygen gas bubbling for 1 hour and cooled to RT. The solid content of the solution was adjusted to 75% by adding additional toluene. Then, the product dissolved in toluene was obtained. Based on $^{13}C$- and $^{29}Si$-NMR analysis, the obtained bis-vinyldimethylsiloxy-terminated poly(dimethyl/methyl,methacryloxypropyl)siloxane copolymer comprised the following average unit formula: $(R^4_3SiO_{1/2})_{0.00074}(R^4_2SiO_{2/2})_{0.99926}$; where each $R^4$ was independently selected from methyl, methacryloxypropyl, and vinyl; and the subscripts represented mole fractions. The methacryl content was 0.192 mole % of total $R^4$, the vinyl content was 0.012 mole % of total $R^4$, and the methyl content was 99.796 mole % of total $R^4$. The (m+o)/n ratio is 260/1. [Methacryl Content=0.051 mmol/g, Vi Content=0.010 mmol/g, Total Reactive group=0.061 mmol/g]. Alternatively, the obtained bis-vinyldimethylsiloxy-terminated poly(dimethyl/methyl, methacryloxypropyl)siloxane copolymer could be shown as $(ViMe_2SiO)_2ViMe_2SiO(MaMeSiO)_{10}(Me_2SiO)_{2679}$.

In this Reference Example 4, a bis-vinyl-terminated poly (dimethyl/methyl,methacryloxypropyl)siloxane copolymer shown as Starting Material A-4 in Table 1, above, was synthesized as follows. To a 4-neck 1 liter round bottom flask 3-methacryloxypropyl methyl dimethoxysilane (120.00 g, DOWSIL™ Z-6033) and 0.1N HCl (128.87 g) were added and mixed using a magnetic stir bar at ~23° C. Using a simple distillation glassware setup vacuum was pulled to ~20 mmHg for 1.5 hours. After 1.5 hours the vacuum was released and bis-hydroxy-terminated polydimethylsiloxane (786.50 g, OH Fluid) along with 0.23 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (380 g, Sigma-Aldrich) and bis-dimethylvinylsiloxy-terminated polydimethylsiloxane (2.87 g, End-blocker) were added. The solution was then heated to 111-115° C., with 0.3 mL of phosphazene catalyst being added at 90° C. The overheads were collected in the Dean Stark trap and an additional 0.3 mL of phosphazene catalyst was added. The solution was held at toluene reflux for 1 hour. The heat was removed, and the solution was cooled. At ~60° C., trihexylamine (0.3 g, Sigma Aldrich) was added to the reaction solution and mixed for 2 hours. And, the solution was heated to 120° C. with nitrogen/2% oxygen gas bubbling for 1 hours and cooled to RT. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl)siloxane copolymer comprised the following unit formula: $(R^4{}_3SiO_{1/2})_{0.00071}(R^4{}_2SiO_{2/2})_{0.99929}$; where each $R^4$ was independently selected from methyl, methacryloxypropyl, and vinyl; and the subscripts represent mole fractions. The methacryl content was 2.406 mole % of total $R^4$, the vinyl content was 0.012 mole % of total $R^4$, and the methyl content was 97.582 mole % of total $R^4$. The (m+o)/n ratio is 20/1. [Methacryl Content=0.604 mmol/g, Vi Content=0.009 mmol/g, Total Reactive group=0.613 mmol/g]. The obtained bis-vinyldimethylsiloxy-terminated poly(dimethyl/methyl, methacryloxypropyl)siloxane copolymer can also be expressed as unit formula: $(ViMe_2SiO)_2(MaMeSiO)_{136}(Me_2SiO)_{2679}$.

In this Reference Example 5, a bis-vinyldimethylsiloxy-terminated poly(dimethyl/methyl,methacryloxypropyl)siloxane copolymer shown as Starting Material A-5 in Table 1, above, was synthesized as follows. To a 4-neck 1 liter round bottom flask 3-methacryloxypropyl methyl dimethoxysilane (4.5 g, DOWSIL™ Z-6033) and 0.1 N HCl (4.55 g) were added and mixed using a magnetic stir bar at room temperature (~23° C.). Using a simple distillation glassware setup vacuum was pulled to ~20 mmHg for 1.5 hours. After 1.5 hours the vacuum was released and dimethyl siloxane, silanol terminated (786.5 g, OH FLUID) along with 0.23 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (450 g, Sigma-Aldrich) and bis-dimethylvinylsiloxy-terminated polydimethylsiloxane (5 g, End-blocker) were added. The solution was then heated to 111-115° C., with 0.1 mL of phosphazene catalyst being added at 90° C. The overheads were collected in the Dean Stark trap and an additional 0.1 mL of phosphazene catalyst was added. The solution was held at toluene reflux for 1 hour. There was ~80 g of overheads collected. The heat was removed, and the solution was cooled. At ~60° C., DVTMDZ (0.3 g, Sigma Aldrich) was added to the reaction solution and mixed for 2 hours. The solid content of the solution was adjusted to 75% by adding additional toluene. Then, the product dissolved in toluene was obtained. Based on $^{13}$C- and $^{29}$Si-NMR analysis, the obtained bis-vinyldimethylsiloxy-terminated poly(dimethyl/methyl,methacryloxypropyl)siloxane copolymer comprised the following average unit formula: $(R^4{}_3SiO_{1/2})_{0.00074}(R^4{}_2SiO_{2/2})_{0.99926}$, where each $R^4$ was independently selected from methyl, methacryloxypropyl, and vinyl, and the subscripts represented mole fractions. The methacryl content was 0.097 mole % of total $R^4$, the vinyl content was 0.022 mole % of total $R^4$, and the methyl content was 99.881 mole % of total $R^4$. The (m+o)/n ratio is 512/1. [Methacryl Content=0.025 mmol/g, Vi Content=0.017 mmol/g, Total Reactive group=0.043 mmol/g] The obtained bis-vinyldimethylsiloxy-terminated poly(dimethyl/methyl,methacryloxypropyl)siloxane copolymer can also be expressed as unit formula: $(ViMe_2SiO)_2(MaMeSiO)_3(Me_2SiO)_{1536}$.

In this Reference Example 6, a bis-vinyldimethylsiloxy-terminated poly(dimethyl/methyl,methacryloxypropyl)siloxane copolymer shown as Starting Material A-6 in Table 1, above, was synthesized as follows. To a 4-neck 1 liter round bottom flask 3-methacryloxypropyl methyl dimethoxysilane (30 g, DOWSIL™ Z-6033), dimethyl, methylvinyl siloxane, sianol termeidated (9.5 g, ME2/MeVi Diol) and 0.1 N HCl (4.55 g) were added and mixed using a magnetic stir bar at room temperature (~23° C.). Using a simple distillation glassware setup vacuum was pulled to ~20 mmHg for 1.5 hours. After 1.5 hours the vacuum was released and dimethyl siloxane, silanol terminated (300 g, OH FLUID) along with 0.03 g of (G-1) MEHQ were added to the reaction solution. The magnetic stir bar was removed and a Teflon paddle with a glass stir rod was used to mix the solution. Vacuum was pulled to ~5 mmHg and the reaction was heated to 80° C. for 1.5 hours. The simple distillation glassware setup was dissembled, and a Dean Stark distillation setup was used for the last reaction step. To the reaction solution, (H-1) toluene (200 g, Sigma-Aldrich). The solution was then heated to 111-115° C., with 0.1 mL of phosphazene catalyst being added at 90° C. The overheads were collected in the Dean Stark trap and an additional 0.1 mL of phosphazene catalyst was added. The solution was held at toluene reflux for 1 hour. There was ~80 g of overheads collected. The heat was removed, and the solution was cooled. At <50° C., HMDZ (1.31 g, Sigma Aldrich) was added to the reaction solution and mixed for 1 hours. Water was added and mixed for 30 min. and then the temperature was elevated to 110° C. to remove water, volaille residuals and ammonia gas for 1 hours. The solid content of the solution was adjusted to 40% by adding additional toluene. Then, the product dissolved in toluene was obtained. Based on $^{13}$C- and $^{29}$Si-NMR analysis, the obtained bis-trimethylsiloxy-terminated poly(dimethyl/methyl,vinyl/methyl,methacryloxypropyl)siloxane copolymer comprised the following average unit formula: $(R^4{}_3SiO_{1/2})_{0.00004}(R^4{}_2SiO_{2/2})_{0.99916}$, where each $R^4$ was independently selected from methyl, methacryloxypropyl, and vinyl, and the subscripts represented mole fractions. The methacryl content was 1.55 mole % of total $R^4$, the vinyl content was 0.4 mole % of total $R^4$, and the methyl content was 98.05 mole % of total $R^4$. The (m+o)/n ratio is 31/1. [Methacryl Content=0.339 mmol/g, Vi Content=0.106 mmol/g, Total Reactive group=0.505 mmol/g] The obtained bis-vinyldimethylsiloxy-terminated poly(dimethyl/methyl, vinyl/methyl,methacryloxypropyl)siloxane copolymer can also be expressed as unit formula: $(Me_3SiO)_2(MaMeSiO)_{155}(ViMeSiO)_{40}(Me_2SiO)_{4795}$.

In this Reference Example 7, a both methacryloxy and vinyl-functional polyorganosilicate resin shown as Starting Material B-3 in Table 4, was synthesized as follows. The following starting materials were charged into a 3-neck 2 L flask equipped with a thermal couple, a mechanical stirrer, a Dean Stark adapted to water cooled condenser and $N_2$ bubbler: 742.2 g of 75% of (B-2) dimethylvinylated and trimethylated silica (Mn=4830, Mw=5030) in xylene, 39.5 g of 3-methacryloxypropylmethyldimethoxysilane, 0.20 g of 4-methoxyphenol, and 120 g of toluene. With vigorous stirring, 1.2 g of trifluoromethane sulfonic acid (from Sigma-Aldrich) was slowly added, and heated to 60° C. After 1 hours. 9.18 g of water was added and stirred for 2 hours. The refluxing temperature gradually rose to 90° C. after 1 hour to collect methanol. The refluxing temperature gradually rose to 127° C. During the above process, water/methanol collected in the Dean Stark was drained out. After no water was distilled out, the flask contents were additionally refluxed for 2 hours with maintaining the temperature. Thereafter, the heat source was removed, and 22.8 g of calcium carbonate (from Sigma-Aldrich) and 50 g of sodium sulfate (from Sigma-Aldrich) were added into the flask. The flask was cooled down to RT. Solids were filtered out through a 0.20 μm filter membrane after stirring for 3 hours. The resulting both methacryloxy and vinyl-functional polyorganosilicate resin was a liquid in solvent (xylene and toluene) (Solid contents=68.4%). The both methacryloxy and vinyl-functional polyorganosilicate resin was represented by the following average formula: $(Me_3SiO_{1/2})_{0.40}(ViMe_2SiO_{1/2})_{0.039}(MaMeSiO_{2/2})_{0.024}(SiO_{4/2})_{0.537}(OH)_{0.01}$, with Methacryl Content=1.79 mol % of total $R^4$; Vinyl Content=2.86 mol % of total R; Methyl content=95.36 mole % of total R; b=3.9 mole %, c+e+f=2.4 mole % [Methacryl Content=0.332 mmol/g, Vi Content=0.532 mmol/g, Total Reactive group=0.864 mmol/g].

In this Reference Example 8, a methacryloxy-functional polyorganosilicate resin shown as Starting Material B-4 in Table 4, was synthesized as follows. In a 500 ml three-necked flask equipped with a mechanical stirrer, thermometer, and Dean Stark trap; a mixture of 375.31 g of a solution containing 75% (B-1) MQ Resin (Mn=3065, Mw=5664) dissolved in 25% xylene, 1.5 g of 11 N KOH aqueous solution, and toluene was refluxed to remove water for 2 hours. 46.47 g of Z-6033 and 0.11 g of (G-1) MEHQ was added to the mixture and the resulting mixture was refluxed for 5 hrs. After cooling to the below 50° C., toluene, methanol, water was added and refluxed for 1 hours at 73° C. The methanol and water were removed with toluene. Toluene corresponding to the lost toluene with methanol and water was added to the mixture. The resulting mixture was additionally refluxed for 3 hours. After cooling to room temperature, acetic acid was added. The mixture was stirred for 1 hour and then filtered. The resulting methacryloxy-functional polyorganosilicate resin was a liquid in solvent (xylene and toluene) (Solid contents=75%). The methacryloxy-functional polyorganosilicate resin was represented by the following average formula: $(Me_3SiO_{1/2})_{0.496}(MaMeSiO_{2/2})_{0.039}(SiO_{4/2})_{0.465}(OH)_{0.45}(OCH_3)_{0.03}$, with Methacryl Content=2.49 mol % of total R; Methyl content=97.51 mole % of total R; b=0 mole %, c+e+f=3.9 mole % [Methacryl Content=0.518 mmol/g, Total Reactive group=0.518 mmol/g].

In this Reference Example 9, Adhesive Force was measured before UV irradiation (initial adhesion) as follows. The silicone hybrid pressure sensitive adhesive composition applied onto a polyethylene terephthalate (PET, 75 μm) film for forming a silicone hybrid pressure sensitive adhesive layer which, after curing, had a thickness of 50 μm-100 μm. A silicone hybrid pressure sensitive adhesive sheet was produced by heating the film for 3 min at 150° C. The obtained sheet was pasted onto a peelable polyethylene terephthalate film by means of a laminator, and the resulting laminate was aged for 1 day at RT. The resulting sheet was cut into tape strips 2.54 cm (1 inch) wide, which were placed on a glass plate and bonded thereto by moving a rubber-lined pressure roller of 2 kg weight on the strip twice back and forth. The assembly was held at RT for 1 hour. The adhesion force (g/inch) required to peel the tape off from the glass plate by pulling at a speed of 2,400 mm/min and an angle of 180°.

To measure adhesive force after UV irradiation, the assembly prepared as described above was held at room temperature for 1 day. Then, the assembly was irradiated with UV light at the condition: Ultraviolet light at a UV illuminance of 1 W/cm² was irradiated from the top surface of the base film with a 365 nm LED lamp (FireJet™ FJ100). Total dosage was 5 J/cm² at UVA.

In this Reference Example 10, to see the residual adhesion rate in the present invention, being an index indicating the amount of migration of the migration components after peeling off, was investigated as follows. The adhesive article was prepared on a PET film as described above in the Reference Example 7. The resulting sheet was placed on a glass plate and bonded thereto by moving a rubber-lined pressure roller of 2 kg weight on the strip twice back and forth. After the assembly was held at RT for 1 day, the assembly was irradiated with UV light at the same condition as described above. Then, the resulting sheet was removed from the glass. At one, TESA™ 7475 (manufactured by TESA) as a reference acrylic tape, were placed on the same area of the glass that was attached/removed on/from the resulting sheet of silicone hybrid pressure sensitive layer, and bonded thereto by moving a rubber-lined pressure roller of 2 kg weight on the strip twice back and forth. As a standard sample, TESA™ 7475 was bonded on the fresh glass as the same manner. The adhesion force (g/inch) required to peel the tape off from the steel plate by pulling at a speed of 300 mm/min at an angle of 180°. The degree of migration, called as Residual Adhesion Rate (%), was calculated from the formula; Residual Adhesion Rate (%)= [adhesion force of test sample, gf/inch]/[adhesion force of the standard sample, gf/inch].

In this Reference Example 11, silicone hybrid pressure sensitive adhesive compositions and comparative compositions were made. Starting material (A) and (B) may be dissolved in solvents. General procedure is described as following; For preparing Inv. 1, a solution was prepared by mixing the following components in a mixer: 133.33 g of the 100 g of starting material (A-1) dissolved in toluene (H-1) with 300 ppm of (G-1); 33.28 g of a of the 24.96 g of the staring material (B-1) dissolved in solvents; 1.33 g of polyorganohydrogensiloxane (C-1); 5.05 g of photoradical initiator (F-1); 0.13 g of hydrosilylation reaction inhibitor (F-1); 50 g of toluene (H-1). After mixing of above components, the obtained solution was further combined with 0.13 g of hydrosilylation reaction catalyst (D-1). Mixing of the above components with the aforementioned solution produced a silicone-based pressure-sensitive adhesive composition. The obtained composition was used for manufacturing an adhesive tape. The produced adhesive tape was evaluated with regard to the lamination property and adhesive force. Comparative examples and Inv. 2-27 were prepared in the same manner using the starting materials and amounts in the tables. Tables 2 and 3 show the starting materials (described in detail in Table 1) and their amounts [based on solids in grams and (solution in grams)] used. The values (solution in grams) indicate that the starting material was first dissolved in solvent, and represents the weight in grams of the solution. The values based on solids indicate the amount of the starting material excluding solvent.

TABLE 2

Comparative Examples 1-10 (Comp. 1-Comp. 10)

| | Comp. 1 | Comp. 2 | Comp. 3 | Comp. 4 | Comp. 5 | Comp. 6 | Comp. 7 | Comp. 8 | Comp. 9 | Comp. 10 |
|---|---|---|---|---|---|---|---|---|---|---|
| Starting Materials | | | | | | | | | | |
| A-1 | | | | | | | 100 (133.3) | 100 (133.3) | 100 (133.3) | 100 (133.3) |
| A'-7 | 100 (333.33) | 100 (333.33) | 100 (333.33) | | | | | | | |
| A'-8 | | | | 100 (400) | 100 (400) | 100 (400) | | | | |
| B-1 | | | 35.29 (47.05) | | 17.6 (23.46) | | | | 23.63 (31.5) | 66.18 (88.2) |
| B-2 | | | | | | 17.6 (23.4) | | | | |
| C-1 | 0.05 | | | 1.88 | 1.88 | 1.88 | 2.13 | 3.06 | 5.48 | 7.84 |
| C-2 | | 0.144 | 1.51 | | | | | | | |
| D-1 | 0.13 | 0.13 | 0.13 | 0.13 | 0.13 | 0.13 | 0.15 | 0.15 | 0.15 | 0.15 |
| E-1 | | | | | | | 3.06 | 3.09 | 3.87 | 5.22 |
| F-1 | 0.3 | 0.3 | 0.3 | 0.15 | 0.15 | 0.15 | 0.1 | 0.1 | 0.1 | 0.1 |
| H-1 | | | | | | | 50.00 | 50.00 | 50.0 | 50.0 |
| Total Solid | 100.48 | 100.57 | 137.23 | 102.16 | 119.76 | 119.76 | 105.47 | 106.43 | 133.26 | 179.52 |
| Total Solution Calculations | 400.48 | 400.57 | 448.99 | 402.16 | 425.63 | 425.63 | 188.81 | 189.77 | 224.47 | 284.91 |
| % solids | 25% | 25% | 31% | 25% | 28% | 28% | 56% | 56% | 59% | 63% |
| % solvent | 75% | 75% | 69% | 75% | 72% | 72% | 44% | 44% | 41% | 37% |
| Resin/Polymer Ratio | 0.00 | 0.00 | 0.35 | 0.00 | 0.18 | 0.18 | 0.00 | 0.00 | 0.24 | 0.66 |
| SiH/Reactive Group Ratio | 1.76 | 2.46 | 25.82 | 1.04 | 1.04 | 0.73 | 0.96 | 1.38 | 2.47 | 3.53 |
| Measurements | | | | | | | | | | |
| Thickness (um) | 70 | 71 | 70 | 74 | 74 | 74 | 79 | 80 | 79 | 80 |
| Initial Adhesion (g/in), before UV irradiation | 4.1 | 6.3 | 86.6 | 0.9 | 6.4 | 4.0 | 3.2 | 2.5 | 2.6 | 19.1 |
| Subsequent Adhesion (g/in), after UV irradiation | 4.1 | 6.2 | 86.1 | 1.1 | 6.5 | 3.9 | 2.7 | 2.0 | 2.8 | 15.0 |
| % Decrease of Adhesion | 0% | −2% | −1% | 22% | 2% | −3% | −16% | −20% | 8% | −21% |
| Residual Adhesion Rate (%) | 55% | 47% | 53% | 72% | 66% | 64% | 96% | 94% | 96% | 94% |

TABLE 3

Comparative Examples 11-13 (Comp. 11-Comp. 13) & Working Examples 1 to 7 (Inv. 1 to 7)

| | Comp. 11 | Comp. 12 | Comp. 13 | Inv. 1 | Inv. 2 | Inv. 3 | Inv. 4 | Inv. 5 | Inv. 6 | Inv. 7 |
|---|---|---|---|---|---|---|---|---|---|---|
| Starting Materials | | | | | | | | | | |
| A-1 | 100 (133.33) | 100 (133.33) | | 100 (133.33) | 100 (133.33) | 100 (133.33) | 100 (133.33) | 100 (133.33) | 100 (133.33) | 100 (133.33) |
| A-5 | | | 100 (133.33) | | | | | | | |
| B-1 | | | | 24.96 (33.28) | 25.13 (33.5) | 48.59 (64.78) | 48.99 (65.32) | 98.62 (131.49) | 151.34 (201.78) | |
| B-2 | 35.7 (47.6) | 102.84 (137.12) | 34.3 (45.73) | | | | | | | 33.9 (45.2) |
| C-1 | 9.08 | 13.93 | 0.90 | 1.33 | 2.01 | 1.64 | 2.48 | 3.45 | 4.30 | 1.69 |
| D-1 | 0.3 | 0.3 | 0.33 | 0.13 | 0.13 | 0.16 | 0.17 | 0.23 | 0.3 | 0.17 |
| E-1 | 5.79 | 8.67 | 5.41 | 5.05 | 5.09 | 6.01 | 6.06 | 8.08 | 10.23 | 5.42 |

TABLE 3-continued

Comparative Examples 11-13 (Comp. 11-Comp. 13) & Working Examples 1 to 7 (Inv. 1 to 7)

| | Comp. 11 | Comp. 12 | Comp. 13 | Inv. 1 | Inv. 2 | Inv. 3 | Inv. 4 | Inv. 5 | Inv. 6 | Inv. 7 |
|---|---|---|---|---|---|---|---|---|---|---|
| F-1 | 0.3 | 0.36 | 0.36 | 0.13 | 0.13 | 0.16 | 0.17 | 0.23 | 0.3 | 0.17 |
| H-1 | 50.00 | 50.00 | 50.00 | 50.00 | 50.00 | 50.00 | 50.00 | 50.00 | 50.00 | 50.00 |
| Total Solid | 151.20 | 226.13 | 141.33 | 131.63 | 132.52 | 156.59 | 157.90 | 210.64 | 266.50 | 141.38 |
| Total Solution Calculations | 246.43 | 343.74 | 236.09 | 223.28 | 224.23 | 256.12 | 257.56 | 326.85 | 400.28 | 236.02 |
| % solids | 61% | 66% | 60% | 59% | 59% | 61% | 61% | 64% | 67% | 60% |
| % solvent | 39% | 34% | 40% | 41% | 41% | 39% | 39% | 36% | 33% | 40% |
| Resin/Polymer Ratio | 0.36 | 1.03 | 0.34 | 0.25 | 0.25 | 0.49 | 0.49 | 0.99 | 1.51 | 0.34 |
| SiH/Reactive Group Ratio Measurements | 2.40 | 2.07 | 0.51 | 0.60 | 0.91 | 0.74 | 1.12 | 1.55 | 1.94 | 0.46 |
| Thickness (um) | 73 | 89 | 89 | 80 | 85 | 90 | 90 | 85 | 85 | 95 |
| Initial Adhesion (g/in), before UV irradiation | 9.4 | 2.8 | 19.6 | 4.6 | 4.9 | 11.2 | 8.1 | 34.4 | 384.7 | 10.0 |
| Subsequent Adhesion (g/in), after UV irradiation | 7.4 | 2.5 | 16.5 | 2.3 | 2.5 | 3.6 | 3.7 | 16.7 | 174.1 | 4.4 |
| % Decrease of Adhesion | −21% | −11% | −16% | −51% | −50% | −68% | −54% | −52% | −55% | −56% |
| Residual Adhesion Rate (%) | 81% | 83% | 78% | 96% | 87% | 85% | 95% | 86% | 87% | 97% |

TABLE 4

Working Examples 8 to 17 (Inv. #8 to Inv. 17)

| | Inv. 8 | Inv. 9 | Inv. 10 | Inv. 11 | Inv. 12 | Inv. 13 | Inv. 14 | Inv. 15 | Inv. 16 | Inv. 17 |
|---|---|---|---|---|---|---|---|---|---|---|
| Starting Materials | | | | | | | | | | |
| A-1 | 100 (133.33) | 100 (133.33) | 100 (133.33) | 100 (133.33) | 100 (133.33) | 100 (133.33) | 100 (133.33) | 100 (133.33) | 100 (133.33) | 100 (133.33) |
| B-2 | 34.19 (45.58) | 34.48 (45.97) | 182.21 (242.94) | | | | | | | |
| B-3 | | | | 50.01 (73.11) | 78.27 (114.42) | 81.74 (119.5) | 173.75 (254.02) | 53.71 (78.52) | 52.25 (76.4) | 85.54 (125.06) |
| C-1 | 2.56 | 3.45 | 5.26 | 1.72 | 2.13 | 6.67 | 5.26 | | | |
| C-3 | | | | | | | | 9.26 | 6.31 | 11.63 |
| D-1 | 0.17 | 0.17 | 0.35 | 0.18 | 0.21 | 0.22 | 0.5 | 0.19 | 0.18 | 0.23 |
| E-1 | 5.47 | 5.52 | 11.50 | 6.07 | 7.22 | 7.54 | 11.16 | 6.15 | 6.09 | 7.42 |
| F-1 | 0.17 | 0.17 | 0.35 | 0.17 | 0.21 | 0.15 | 0.5 | 0.1 | 0.1 | 0.1 |
| H-1 | 50.00 | 50.00 | 50.00 | 50.00 | 50.00 | 50.00 | 50.00 | 50.00 | 50.00 | 50.00 |
| Total Solid | 142.59 | 143.82 | 299.70 | 158.18 | 188.07 | 196.35 | 291.20 | 169.44 | 164.97 | 204.96 |
| Total Solution Calculations | 237.32 | 238.64 | 443.77 | 264.62 | 307.56 | 317.44 | 454.80 | 277.59 | 272.44 | 327.81 |
| % solids | 60% | 60% | 68% | 60% | 61% | 62% | 64% | 61% | 61% | 63% |
| % solvent | 40% | 40% | 32% | 40% | 39% | 38% | 36% | 39% | 39% | 37% |
| Resin/Polymer Ratio | 0.34 | 0.34 | 1.82 | 0.50 | 0.78 | 0.82 | 1.74 | 0.54 | 0.52 | 0.86 |
| SiH/Reactive Group Ratio Measurement | 0.69 | 0.92 | 0.51 | 0.35 | 0.33 | 1.00 | 0.45 | 0.49 | 0.34 | 0.46 |
| Thickness (um) | 85 | 85 | 85 | 80 | 81 | 81 | 78 | 80 | 87 | 84 |
| Initial Adhesion (g/in), before UV irradiation | 10.6 | 6.2 | 258.9 | 27.5 | 72.0 | 11.5 | 92.5 | 8.6 | 16.6 | 14.0 |

TABLE 4-continued

Working Examples 8 to 17 (Inv. #8 to Inv. 17)

| | Inv. 8 | Inv. 9 | Inv. 10 | Inv. 11 | Inv. 12 | Inv. 13 | Inv. 14 | Inv. 15 | Inv. 16 | Inv. 17 |
|---|---|---|---|---|---|---|---|---|---|---|
| Subsequent Adhesion (g/in), after UV irradiation | 3.5 | 3.5 | 44.7 | 6.2 | 8.4 | 4.0 | 20.8 | 4.0 | 3.9 | 6.0 |
| % Decrease of Adhesion | −67% | −44% | −83% | −77% | −88% | −65% | −78% | −54% | −76% | −57% |
| Residual Adhesion Rate (%) | 98% | 96% | 84% | 78% | 79% | 83% | 91% | 83% | 79% | 83% |

TABLE 5

Working Examples 18-27 (Inv. #18 to Inv. 27)

| | Inv. 18 | Inv. 19 | Inv. 20 | Inv. 21 | Inv. 22 | Inv. 23 | Inv. 24 | Inv. 25 | Inv. 26 | Inv. 27 |
|---|---|---|---|---|---|---|---|---|---|---|
| Starting Materials | | | | | | | | | | |
| A-1 | 100 (133.33) | | | | | | | | 100 (133.33) | 100 (133.33) |
| A-2 | | 100 (133.33) | 100 (133.33) | 100 (133.33) | | | 100 (133.33) | 100 (133.33) | | |
| A-3 | | | | | 100 (133.33) | | | | | |
| A-4 | | | | | | 100 (133.33) | | | | |
| B-2 | | | 34.11 (45.48) | 33.88 (45.17) | 34.11 (45.48) | 44.05 (58.73) | 34.2 (45.6) | 34.2 (45.6) | 34.58 (46.1) | 34.6 (46.13) |
| B-3 | 82.66 (120.85) | 48.99 (71.62) | | | | | | | | |
| C-1 | | 2.48 | 2.32 | 2.48 | 2.32 | 2.79 | 2.60 | 2.60 | 2.35 | 2.35 |
| C-3 | 7.87 | | | | | | | | | |
| D-1 | 0.22 | 0.17 | 0.14 | 0.14 | 0.14 | 0.14 | 0.1 | 0.14 | 0.36 | 0.69 |
| E-1 | 7.31 | 6.06 | 4.09 | 4.09 | 4.09 | 4.41 | 4.10 | 4.10 | 4.11 | 4.11 |
| F-1 | 0.1 | 0.17 | 0.14 | 0.14 | 0.14 | 0.15 | 0.14 | 0.15 | 0.15 | 0.15 |
| H-1 | 50.00 | 50.00 | 50.00 | 50.00 | 50.00 | 50.00 | 50.00 | 50.00 | 50.00 | 50.00 |
| I-1 | | | | | | | | 1.37 | | |
| I-2 | | | | | | | | 1.37 | | |
| I-3 | | | | | | | | | 1.38 | 1.38 |
| Total Solid | 198.19 | 157.90 | 140.83 | 140.76 | 140.83 | 151.57 | 142.51 | 142.56 | 142.96 | 143.31 |
| Total Solution Calculations | 319.71 | 263.86 | 235.54 | 235.39 | 235.54 | 249.58 | 237.25 | 237.30 | 237.82 | 238.18 |
| % solids | 62% | 60% | 60% | 60% | 60% | 61% | 60% | 60% | 60% | 60% |
| % solvent | 38% | 40% | 40% | 40% | 40% | 39% | 40% | 40% | 40% | 40% |
| Resin/Polymer Ratio | 0.83 | 0.49 | 0.34 | 0.34 | 0.34 | 0.44 | 0.34 | 0.34 | 0.35 | 0.35 |
| SiH/Reactive Group Ratio | 0.32 | 0.60 | 0.78 | 0.84 | 1.23 | 0.48 | 0.88 | 0.88 | 0.63 | 0.63 |
| Measurements | | | | | | | | | | |
| Thickness (um) | 86 | 75 | 67 | 60 | 90 | 70 | 70 | 70 | 70 | 70 |
| Initial Adhesion (g/in), before UV irradiation | 27.5 | 16.9 | 15.1 | 22.0 | 23.2 | 12.2 | 10.0 | 12.6 | 13.3 | 13.4 |
| Subsequent Adhesion (g/in), after UV irradiation | 7.5 | 5.5 | 5.3 | 5.4 | 13.5 | 5.1 | 5.4 | 5.1 | 3.5 | 3.3 |
| % Decrease of Adhesion | −73% | −67% | −65% | −75% | −42% | −58% | −46% | −60% | −74% | −75% |
| Residual Adhesion Rate (%) | 78% | 83% | 77% | 73% | 79% | >99.9% | 92% | >99.9% | >99.9% | >99.9% |

TABLE 6

Comparative Examples 14-15 (Comp. 14-Comp. 15) & Working Examples 28 (Inv. 28)

| | Comp. 14 | Comp. 15 | Inv. 28 |
|---|---|---|---|
| Starting Materials | | | |
| A-1 | 100 (133.33) | 100 (133.33) | |
| A-6 | | | 100 (250) |
| B-2 | | | 34.6 (46.13) |
| B'-4 | 101 (134.66) | 54.7 (72.93) | |
| C-1 | 2.04 | 1.56 | 2.35 |
| D-1 | 0.2 | 0.2 | 0.2 |
| E-2 | 0.81 | 0.63 | 0.48 |
| F-1 | 0.16 | 0.13 | 0.06 |
| H-1 | 50.00 | 50.00 | 50.00 |
| Total Solid | 204.70 | 157.71 | 121.44 |
| Total Solution Calculations | 320.89 | 258.65 | 326.91 |
| % solids | 64% | 61% | 37% |
| % solvent | 36% | 39% | 63% |
| Resin/Polymer Ratio | 1.01 | 0.55 | 0.18 |
| SiH/Reactive Group Ratio Measurements | 0.37 | 0.39 | 0.79 |
| Thickness (um) | 65 | 68 | 31 |
| Initial Adhesion (g/in), before UV irradiation | 8.1 | 3.0 | 13.4 |
| Subsequent Adhesion (g/in), after UV irradiation | 8.6 | 2.8 | 3.3 |
| % Decrease of Adhesion | 6% | −7% | −75% |
| Residual Adhesion Rate (%) | 89% | 92% | 90% |

INDUSTRIAL APPLICABILITY

The silicone hybrid pressure sensitive adhesive composition described herein can cure to form a silicone hybrid pressure sensitive adhesive suitable for use in protective films for (opto)electronic device fabrication processes (e.g., for flexible OLED display devices or other devices). The examples above show that the silicone hybrid pressure sensitive adhesive composition can be formulated to cure via hydrosilylation to form a silicone hybrid pressure sensitive adhesive with initial adhesion (before UV irradiation) of 4 gf/in to 385 gf/in on glass as tested by the method of Reference Example 7 described herein. After UV irradiation, the adhesion decreases by at least 40%, alternatively at least 50%, alternatively 44% to 88%, as compared to the initial adhesion.

Without wishing to be bound by theory, it is thought that adhesion properties on glass will provide comparable results on substrates used in (opto)electronic device fabrication processes, such as passivation layers, and it is expected that the combination of properties described above allows the silicone hybrid pressure sensitive adhesive film to be used as a protective film on these substrates during fabrication of the (opto)electronic device. The silicone hybrid pressure sensitive adhesive composition may be heated to cure via hydrosilylation reaction to produce the silicone hybrid pressure sensitive adhesive on a substrate, such as PET, to form a protective film. The resulting protective film may be used to protect a layer in the device during processing. Thereafter, the silicone hybrid pressure sensitive adhesive may be irradiated with UV radiation, which causes the adhesion to decrease. Without wishing to be bound by theory, it is thought that the decrease in adhesion can allow the silicone hybrid pressure sensitive adhesive to detach from the passivation layer with minimal damage to, and/or minimal residue left on, the passivation layer in the device. Without wishing to be bound by theory, it is thought the SiH/Reactive Group Ratio <2 contributes to the benefit in changing adhesion by ensuring sufficient reactive groups are present after hydrosilylation cure to allow for further reaction when the silicone hybrid pressure sensitive adhesive is irradiated with UV irradiation.

For example, Comp. 9-12 in Table 1 above show that when SiH/Reactive Group Ratio is higher than 2, the adhesion after UV irradiation does not decrease sufficiently. Using the same starting materials in different amounts such that SiH/Reactive group ratio is 0.46 to 1.12, Inv. 1 to 4 and Inv. 7 to 9 in Table 2 show that silicone hybrid pressure sensitive adhesives with adhesion of 4.6 gf/in to 11.2 gf/in before irradiation (suitable for protective films for passivation layers in OLED display devices), and adhesion of 2.3 gf/in to 4.4 gf/in after UV irradiation can be prepared. Inv. 5 and Inv. 10 in Table 2 also show that when SiH/Reactive Group Ratio is less than 2 with relatively higher resin/polymer (R/P) ratio 0.99 to 1.94, the adhesion after UV irradiation efficiently decreases by −52% to −83%. This parameter also could be proven by using different types of polyorganosilicate (B-3) and polyorganohydrgensiloxane (C-3) through Inv.11 to In. 18.

Moreover, without wishing to be bound by theory, it is thought the m/n Ratio <500/1 in unit formula of polydiorganosiloxane (A) contributes to the benefit in changing adhesion by ensuring sufficient reactive groups to allow for further reaction sufficiently by UV irradiation. For example, Comp. 13 showed that when m/n Ratio 527 (>500/1), the adhesion after UV irradiation did not decrease sufficiently. Using the different polydiorganosiloxane such that m/n Ratio is 20/1 to 260/1, Inv. 8 (A-1, m/n=37/1), Inv. 21 (A-2, 56/1), Inv.22 (A-3, 260/1), Inv. 23 (A-4, 20/1) showed that the adhesion decreased by (at least) over 40% after UV irradiation. Inv, 8, Inv. 21, and Inv. 23 when m/n ratio <100/1 showed that the adhesion after UV irradiation decreased by over 50%. Accordingly, lower m/n Ratios, contribute to the benefit in changing adhesion by ensuring sufficient reactive groups are present after hydrosilylation cure to allow for further reaction when the silicone hybrid pressure sensitive adhesive is irradiated with UV irradiation.

Without wishing to be bound by theory, it is thought that conventional silicone pressure sensitive adhesives may suffer from one of the following drawbacks. If adhesion of the silicone pressure sensitive adhesive is too low, then the protective film may be easily delaminated or not adhere to the passivation layer during fabrication of the (opto)electronic device, thus providing insufficient protection. However, if the adhesion of the silicone pressure sensitive adhesive to the passivation layer is too high, then the passivation layer may be not easily peeled off and possibly damaged when the protective film is removed. For industrial use, depending on surface feature of adherends, each different level of adhesion at the narrow range (for example, 3, 4, 5, 6, 7, 8, 9, 10, 11, 12 gf/in) should have been dedicatedly controlled by several composition, to satisfy easy attaching and peeling off. Therefore, the silicone hybrid pressure sensitive adhesive described herein may provide an integrated solution to satisfy overall types of surface feature of (opto)electric devices.

Moreover, silicone residual migration at surface of adherends from silicone-based pressure sensitive adhesives has been an unsolvable problem in an industrial field, which causes contamination of (opto)electric devices. For example, Comp. 1 to Comp. 6 are conventional pressure sensitive adhesives, which showed Residual Adhesion Rate (%) was 47% to 72%, mostly less than 70%, In contrast, Inv. 1 to Inv. 23 showed Residual Adhesion Rate (%) was 72% to >99.9%. Among them, Inv. 23 showed that the highest Residual Adhesion Rate (%) is >99.9% when the lowest m/n Ratio (20/1 of (A-4), which indicate it may related with sufficient further reaction after UV irradiation leads to minimize residual silicone migration. Moreover, it is thought that addition of additive (I) contributes to the benefit in improving residual silicone migration by allowing efficient further reaction sufficiently by UV irradiation. For example, Inv. 21 and Inv. 24 using the same starting materials with similar SiH/Reactive Group Ratio demonstrated that Inv. 24 with addition of additive (I-1) showed Residual Adhesion Rate (%)=92%, higher than 73% of Inv. 21. Inv. 26 to 27 with addition of additive (I-2) also showed improved Residual Adhesion Rate (%)=>99.9% when compared with Inv.7 to Inv. 8 (97-98%).

Comp. 14 and Comp. 15 demonstrated that (meth)acryl functional polyorganosilicate (B-4) which does not have vinyl groups is less effective in decreasing adhesion after UV irradiation than a (meth)acryl functional polyorganosilicate that also has vinyl groups, under the conditions tested herein. (Meth)acryl functional polyorganosilicate (B-4) differently behaved from both (meth)acryl and vinyl functional polyorganosilicate (B-3), as shown in Inv 11 to 19 under the conditions tested herein. Without wishing to be bound by theory, it might be because vinyl group-containing methacryl functional polyoranosilicate (B-3) effectively participates in hydrosilylation reaction promoted by hydrosilylation catalyst, and thus it is well incorporated homogenously in a cured matrix with Starting Material (A) by crosslinker (Starting Material (C)). In contrast, (meth) acryl functional polyorganosilicate may not be incorporated well in a cured matrix due to lower reactivity of (meth)acryl group during hydrosilylation reaction, than vinyl groups. In this case, an intermolecular reaction between microphase-separated methacryl functional polyorganosilicates may have occurred by UV irradiation, rather than the reaction with methacryl group of Starting Material A. Accordingly, adhesion decreasing properties are different between Staring Material (B-3) and (B-4).

Problems to be Solved

Organic-based pressure sensitive adhesives which include polymers with hydrocarbon backbone polymer chains may have poor wettability on substrates used during fabrication of (opto)electronic devices. Without wishing to be bound by theory, it is thought that rigidity of the hydrocarbon backbone chains contributes to this poor wettability, which can cause difficulty laminating and/or bubbles forming on the substrates. If pressure or heat is applied, this can cause damage to fragile surfaces, such as passivation layers in (opto)electronic devices.

In the past, an adhesive including a physical mixture of a polyorganosiloxane and a UV reactive organic molecule was proposed. However, it was difficult to obtain a homogenous pressure sensitive adhesive composition due to poor compatibility of polyorganosiloxanes and organic molecules, which could suffer from the drawback of forming hazy or opaque pressure sensitive adhesives. Such compositions were not suitable for (opto)electronic device fabrication processes.

The present silicone hybrid pressure sensitive adhesive composition solves the above problems because it can cure to form a silicone hybrid pressure sensitive adhesive with suitable adhesion to, and ability to wet, surfaces such as passivation layers in (opto)electronic devices without entrapping bubbles or requiring pressure or harsh conditions that may damage the passivation layer in order to adhere. However, the silicone hybrid PSA may also have the ability to release from such surfaces with minimal damage and/or residue after UV irradiation.

Usage of Terms

The BRIEF SUMMARY OF THE INVENTION and ABSTRACT are hereby incorporated by reference. All amounts, ratios, and percentages are by weight unless otherwise indicated by the context of the specification. The articles 'a', 'an', and 'the' each refer to one or more, unless otherwise indicated by the context of the specification. The disclosure of ranges includes the range itself and also anything subsumed therein, as well as endpoints. For example, disclosure of a range of >0.3 to 0.8 includes not only the range of >0.3 to 0.8, but also 0.4, 0.55, 0.6, 0.7, 0.78, and 0.8 individually, as well as any other number subsumed in the range. Furthermore, disclosure of a range of, for example, >0.3 to 0.8 includes the subsets of, for example, 0.4 to 0.6, 0.35 to 0.78, 0.41 to 0.75, 0.78 to 0.8, 0.32 to 0.41, 0.35 to 0.5 as well as any other subset subsumed in the range. Similarly, the disclosure of Markush groups includes the entire group and also any individual members and subgroups subsumed therein. For example, disclosure of the Markush group a vinyl, allyl or hexenyl includes the member vinyl individually; the subgroup vinyl and hexenyl; and any other individual member and subgroup subsumed therein.

Abbreviations used in this application are as defined below in Table 5.

TABLE 5

| Abbreviation | Definition |
| --- | --- |
| ° C. | degrees Celsius |
| Cm | Centimeter |
| DP | Degree of polymerization |
| ETCH | Ethynyl cyclohexanol |
| FT-IR | Fourier Transform Infra Red |
| G | Grams |
| GCMS | Gas chromatography mass spectrometry |
| GPC | Gel permeation chromatography |
| Hr | Hour |
| J | Joules |
| KG or kg | Kilograms |
| Kgf | Kilograms force |
| Ma | methacryloxypropyl |
| Mbar | Millibar |
| Me | Methyl |
| (meth)acryl | a general term including both methacryl and acryl |
| Min | Minutes |
| Mm | Millimeters |
| Mn | Number average molecular weight measured by GPC |

TABLE 5-continued

| Abbreviation | Definition |
|---|---|
| mPa · s | milliPascal seconds |
| Mw | Weight average molecular weight measured by GPC |
| Nm | Nanometers |
| OLED | Organic light emitting diode |
| Pa | Pascals |
| PD | Polydispersity |
| Ph | Phenyl |
| RPM | Revolutions per minute |
| RT | Room temperature of 25 ± 5° C. |
| μm | Micrometers |
| UV | ultra-violet |
| Vi | Vinyl |
| W | Watts |

Test Methods

[NMR Analysis]

An average molecular formula of starting materials (A) and (B), such as those mentioned in the Reference Example 1 to 6 was determined based on the following $^{29}$Si-NMR and $^{13}$C-NMR analysis: NMR apparatus: Fourier Transform Nuclear Magnetic Resonance Spectrometer JEOL (JEOL is a registered trademark of JEOL Ltd. Japan) JNM-EX400 (the product of JEOL Ltd.).

Determination method: Integrated values of the peaks were calculated based on signals derived from $^{29}$Si for various siloxane units shown below. An average molecular formula was identified by finding ratios of the integrated signal values obtained for various siloxane units (M units, D units, T unit and Q units) and then finding siloxane-unit ratios based on the determined signal ratios. Due to overlap of chemical shift of $Me_2SiO_{2/2}$ units and $MaMeSiO_{2/2}$ unit in $^{28}$Si-NMR, the ratio of $Me_2SiO_{2/2}$(D) and $MaMeSiO_{2/2}$(D'), was identified by $^{13}$C-NMR. The contents of Reactive Group including unsaturated bonds and (meth)acryl groups was derived from an average molecular formula.

[SiH/Vi Ratio and SiH/Reactive Group Ratio]

SiH/Vi Ratio was calculated from the following equation.

$$SiH/Vi\ \text{Ratio} = \frac{SiH\ \text{Content}\left[\frac{\text{mmol}}{\text{g}}\right]\ \text{of}\ (C) \times \text{weight [g] of}\ (C)}{Vi\ \text{Content}\left[\frac{\text{mmol}}{\text{g}}\right]\ \text{of}\ (A) \times \text{weight [g] of}\ (A) + Vi\ \text{Content}\left[\frac{\text{mmol}}{\text{g}}\right]\ \text{of}\ (B) \times \text{weight [g] of}\ (B)}$$

$$SiH/\text{Reactive Group Ratio} = \frac{SiH\ \text{Content}\left[\frac{\text{mmol}}{\text{g}}\right]\ \text{of}\ (C) \times \text{weight [g] of}\ (C)}{\text{Reative Group Content}\left[\frac{\text{mmol}}{\text{g}}\right]\ \text{of}\ (A) \times \text{weight [g] of}\ (A) + \text{Reative Group}\left[\frac{\text{mmol}}{\text{g}}\right]\ \text{of}\ (B) \times \text{weight [g] of}\ (B)}$$

[Gel Permeation Chromatography]

Molecular weight was measured by gel permeation chromatography according to the following method: Samples were prepared in toluene at 0.5% w/v concentration, filtered with a 0.45 μm PTFE syringe filter, and analyzed against polystyrene standards. The relative calibration (3rd order fit) used for molecular weight determination was based on 16 polystyrene standards ranging in molecular weights from 580 to 2,610,000 Daltons. The chromatographic equipment consisted of a Waters 2695 Separations Module equipped with a vacuum degasser, a Waters 2414 differential refractometer and two (7.8 mm×300 mm) styragel HR columns (molecular weight separation range of 100 to 4,000,000) preceded by a styragel guard column (4.6×30 mm). The separation was performed using toluene programmed to flow at 1.0 mL/min., injection volume was set at 100 μL and columns and detector were heated to 45° C. Data collection was 60 min and processing was performed using Empower software. As used herein for resins, Mw (Weight Average Molecular Weight) and Mn(Number Average Molecular Weight). [Adhesion Force and Residual Adhesion Rate]

Adhesive Force and Residual Adhesion Rate were measured as described above in Reference Example 7 and 8, respectively.

Embodiments of the Invention

In a first embodiment of the invention, a silicone hybrid pressure sensitive adhesive composition comprises: 100 parts by weight of (A) a linear, or substantially linear, polydiorganosiloxane having reactive groups comprising a silicon bonded (meth)acryloxyalkyl-functional group in a pendant position and optionally a silicon bonded aliphatically unsaturated hydrocarbon group in a terminal position, wherein starting material (A) comprises unit formula $M_pM''_qD_mD_nD''_oT'''_rQ_s$, where M represents a unit of formula $(R^1_3SiO_{1/2})$, M'' represents a unit of formula $(R^1_2R^3SiO_{1/2})$, D represents a unit of formula $(R^1_2SiO_{2/2})$, D' represents a unit of formula $(R^1R^2SiO_{2/2})$, D'' represents a unit of formula $(R^1R^3SiO_{2/2})$ T''' represents a unit of formula $(R^5SiO_{3/2})$, and Q represents a unit of formula $(SiO_{4/2})$, where each $R^1$ is a monovalent hydrocarbon group free of aliphatic unsaturation, each $R^2$ is the (meth)acryloxyalkyl functional group, each $R^3$ is the aliphatically unsaturated monovalent hydrocarbon group, each $R^5$ is independently selected from the group consisting of $R^1$, $R^2$, and $R^3$, and subscripts p, q, m, n, r, and s have values such that $0 \leq p$, $0 \leq q$, a quantity $(p+q) \geq 2$, $0 < m < 10,000$, $2 < n \leq 10,000$, $o \geq 0$, a quantity $(m+n+o)$ is 100 to 10,000, a ratio $(m+o)/n$ is 1/1 to 500/1, a ratio $(q+o)/(m+n)$ is $0 \leq$ to 1/5, $0 \leq r \leq 100$, and $0 \leq s \leq 100$; a ratio $(m+n+o)/(r+s)$ is 50/1 to 10,000/1 if $0 < r$ or if $0 < s$;

(B) a polyorganosilicate resin in an amount sufficient to provide a weight ratio of the polyorganosilicate resin to (A) the polydiorganosiloxane (Resin/Polymer Ratio) of 0.15/1 to 1.9/1, where the polyorganosilicate resin comprises unit formula $M_aM''_bM'''_cD_dD'_eT'''_fQ_hX_i$, where M, M'', D, D', T, and Q are as described above, M''' represents a unit of formula $(R^1_2R^2SiO_{1/2})$, T' represents a unit of formula $(R^2SiO_{3/2})$, X represents a hydroxyl group and/or alkoxy group, and subscripts a, b, c, d, e, f, h and i, have values such that;

$a \geq 0$, $b \geq 0$, $c \geq 0$ and a quantity $(a+b+c) > 10$ mole %;

$d \geq 0$, $e \geq 0$, and a quantity $(d+e)$ is 0 to a number sufficient to provide 30 mole % of D units and D' units combined to the resin;

$f \geq 0$, with the proviso that subscript f has a maximum value sufficient to provide 30 mole % of T''' units to the resin;

h>0, with the proviso that subscript h has a value sufficient to provide 30 mole % to 60 mole % of Q units to the resin;
0≤c+e+f<20 mole % if b>0;
c+e+f=0 if b=0;
a+b+c+d+e+f+h=100 mole %;
i≥0 is not included in the molar ratio, with the proviso that subscript i has a maximum value sufficient to provide 5 mole % of hydroxyl groups to the resin.

(C) a polyorganohydrogensiloxane in an amount sufficient to provide a molar ratio of silicon bonded hydrogen atoms in starting material (C) to reactive groups in starting materials (A) and (B) combined (SiH/reactive group ratio) of 0.3 to 2, where the reactive groups are $R^2$ and $R^3$ combined, where the polyorganohydrogensiloxane comprises unit formula $M_tM^H_uD_vD^H_wT_xT^H_yQ_z$, where M, D, T, and Q represent units of the formulas shown above, and $M^H$ represents a unit of formula $(HR^1_2SiO_{1/2})$,
$D^H$ represents a unit of formula $(HR^1SiO_{2/2})$,
$T^H$ represents a unit of formula $(HSiO_{3/2})$, and
subscripts t, u, v, w, x, y, and z have values such that t≥0, u≥0, v≥0, w≥0, x≥0, y≥0, z≥0, a quantity (u+w+y) 3, and a quantity (t+u+v+w+x+y+z) is sufficient to give the polyorganohydrogensiloxane a viscosity of 3 mPa·s to 1,000 mPa·s at 25° C.;

(D) a hydrosilylation reaction catalyst in an amount sufficient to provide 2 ppm to 500 ppm of platinum based on combined weights of all starting materials in the composition;

0.1 to 10 weight %, based on combined weights of starting materials (A), (B) and (C), of (E) a photoradical initiator;
0.0001 to 1 weight %, based on combined weights of starting materials (A), (B) and (C), of (F) a hydrosilylation reaction inhibitor;
0.001 to 0.5 weight %, based on combined weights of starting materials (A), (B) and (C), of (G) a free radical scavenger;
0 to 80 weight %, based on combined weights of starting materials (A), (B) and (C), of (H) a solvent; and
0 to 5 weight %, based on combined weights of starting materials (A), (B) and (C), of (1) an additive selected from the group consisting of a sensitizer and a synergist.

In a second embodiment, a method for fabricating an (opto)electronic device comprises:
1) applying, to a surface of a substrate, a silicone hybrid pressure sensitive adhesive composition comprising
  a silicone hybrid pressure sensitive adhesive composition comprises:
100 parts by weight of (A) a linear, or substantially linear, polydiorganosiloxane having reactive groups comprising a silicon bonded (meth)acryloxyalkyl-functional group in a pendant position and optionally a silicon bonded aliphatically unsaturated hydrocarbon group in a terminal position, wherein starting material (A) comprises unit formula $M_pM''_qD_mD'_nD''_oT_rQ_s$, where M represents a unit of formula $(R^1_3SiO_{1/2})$,
M'' represents a unit of formula $(R^1_2R^3SiO_{1/2})$,
D represents a unit of formula $(R^1_2SiO_{2/2})$,
D' represents a unit of formula $(R^1R^2SiO_{2/2})$,
D'' represents a unit of formula $(R^1R^3SiO_{2/2})$
T represents a unit of formula $(R^1SiO_{3/2})$, and
Q represents a unit of formula $(SiO_{4/2})$, where
  each $R^1$ is a monovalent hydrocarbon group free of aliphatic unsaturation,
  each $R^2$ is the (meth)acryloxyalkyl functional group,
  each $R^3$ is the aliphatically unsaturated monovalent hydrocarbon group, and subscripts p, q, m, n, r, and s have values such that
a quantity (p+q)≥2,
0<m<10,000, 2<n≤10,000, 0<o<10,000, a quantity (m+n+o) is 100 to 10,000, a ratio (m+o)/n is 1/1 to 500/1,
a ratio of (m+n)/(r+s) is 100/1 to 10,000/1 if 0<r or if 0<s;

(B) a polyorganosilicate resin in an amount sufficient to provide a weight ratio of the polyorganosilicate resin to (A) the polydiorganosiloxane (Resin/Polymer Ratio) of 0.15/1 to 1.9/1, where the polyorganosilicate resin comprises unit formula $M_aM''_bM'''_cD_dD'_eT'''_fQ_hX_i$, where M, M'', D, D', T, and Q are as described above, M''' represents a unit of formula $(R^1_2R^2SiO_{1/2})$, T''' represents a unit of formula $(R^2SiO_{3/2})$, X represents a hydroxyl group and/or alkoxy group, and subscripts a, b, c, d, e, f, h and i, have values such that;

a≥0, b≥0, c≥0 and a quantity (a+b+c)>10 mole %;
d≥0, e≥0, and a quantity (d+e) is 0 to a number sufficient to provide 30 mole % of D units and D' units combined to the resin;
f≥0, with the proviso that subscript f has a maximum value sufficient to provide 30 mole % of T''' units to the resin;
h>0, with the proviso that subscript h has a value sufficient to provide 30 mole % to 60 mole % of Q units to the resin;
0≤c+e+f<20 mole % if b>0;
c+e+f=0 if b=0;
a+b+c+d+e+f+h=100 mole %;
i≥0 is not included in the molar ratio, with the proviso that subscript i has a maximum value sufficient to provide 5 mole % of hydroxyl groups to the resin (C) a polyorganohydrogensiloxane in an amount sufficient to provide a molar ratio of silicon bonded hydrogen atoms in starting material (C) to reactive groups in starting materials (A) and (B) combined (SiH/reactive group ratio) of 0.3 to 2, where the reactive groups are $R^2$ and $R^3$ combined, where the polyorganohydrogensiloxane comprises unit formula $M_tM^H_uD_vD^H_wT_xT^H_yQ_z$, where M, D, T, and Q represent units of the formulas shown above, and $M^H$ represents a unit of formula $(HR^1_2SiO_{1/2})$,
$D^H$ represents a unit of formula $(HR^1SiO_{2/2})$,
$T^H$ represents a unit of formula $(HSiO_{3/2})$, and
subscripts t, u, v, w, x, y, and z have values such that t≥0, u≥0, v≥0, w≥0, x≥0, y≥0, z≥0, a quantity (u+w+y) 3, and a quantity (t+u+v+w+x+y+z) is sufficient to give the polyorganohydrogensiloxane a viscosity of 3 mPa·s to 1,000 mPa·s at 25° C.;

(D) a hydrosilylation reaction catalyst in an amount sufficient to provide 2 ppm to 500 ppm of platinum based on combined weights of all starting materials in the composition;
  0.1 to 10 weight %, based on combined weights of starting materials (A), (B) and (C), of (E) a photoradical initiator;
  0.0001 to 1 weight %, based on combined weights of starting materials (A), (B) and (C), of (F) a hydrosilylation reaction inhibitor;
  0.001 to 0.5 weight %, based on combined weights of starting materials (A), (B) and (C), of (G) a free radical scavenger;
  0 to 500 weight %, based on combined weights of starting materials (A), (B) and (C), of (H) a solvent; and 0 to 5 weight %, based on combined weights of starting materials (A), (B) and (C), of (1) an additive selected from the group consisting of a sensitizer and a synergist;

2) heating the composition to form a hybrid pressure sensitive adhesive film;

3) applying the pressure sensitive adhesive film to a passivation layer in the device;

4) using the pressure sensitive adhesive film to protect the passivation layer in the device; and thereafter 5) exposing the pressure sensitive adhesive film to UV radiation; thereby decreasing tack of the pressure sensitive adhesive film.

In a third embodiment, in either the composition of the first embodiment or the method of the second embodiment, (A) the polydiorganosiloxane comprises unit formula $M_2D_mD'_n$, a quantity (m+n) is 100 to 9,000, and a ratio m/n is 10/1 to 500/1.

In a fourth embodiment, in either the composition of the first embodiment or the method of the second embodiment, the quantity (m+n) is 200 to 9,900.

In a fifth embodiment, in either the composition of the first embodiment or the method of the second embodiment, the quantity (m+n) is 300 to 7,000.

In a sixth embodiment, in either the composition of the first embodiment or the method of the second embodiment, the quantity (m+n) is 400 to 6,000.

In a seventh embodiment, in either the composition of the first embodiment or the method of the second embodiment, $R^2$ is present in a mole % of 0.1% to 25% based on combined amounts of $R^1$, $R^2$, and $R^3$.

In an eighth embodiment, in either the composition of the first embodiment or the method of the second embodiment, $R^2$ is present in a mole % of 0.8% to 12%.

In a ninth embodiment, in either the composition of the first embodiment or the method of the second embodiment, $R^2$ is present in a mole % of 1.5% to 6%.

In a tenth embodiment, in either the composition of the first embodiment or the method of the second embodiment, (B) the polyorganosilicate resin comprises a unit formula selected from the group consisting of $M_aQ_h$, $M_aM''_bQ_h$, $M_aM''_bM'''_cQ_h$, $M_aD_dQ_h$, $M''_bD'_eQ_h$, $M_aM''_bM'''_cD_dQ_h$, $M_aM''_bM'''_cD'_eQ_h$, $M_aM''_bD'_eQ_h$, $M_aM''_bM'''_cD'_eQ_h$, $M_aM''_bT'''_fQ_h$, $M_aM''_bM'''_cT'''_fQ_h$, where subscript a is 20 to 65 mole %, subscript b and c is 1 to 30 mole %, subscript d and e is 1 to 20 mole %, subscript f is 1 to 25 mole %, and subscript h is 35 to 55 mole %.

In an eleventh embodiment, in either the composition of the first embodiment or the method of the second embodiment, (C) the polyorganohydrogensiloxane crosslinker comprises unit formula $M_tM^H_uD_vD^H_w$, where a quantity (t+u)=2, and a quantity (u+w)≥3.

In a twelfth embodiment, in either the composition of the first embodiment or the method of the second embodiment, each monovalent hydrocarbon group for $R^1$ is selected independently from the group consisting of alkyl groups and aryl groups.

In a thirteenth embodiment, in the twelfth embodiment, the alkyl group is methyl and the aryl group is phenyl.

In a fourteenth embodiment, in either the composition of the first embodiment or the method of the second embodiment, each $R^1$ is an alkyl group.

In a fifteenth embodiment, in either the composition of the first embodiment or the method of the second embodiment, each (meth)acryloxyalkyl functional group for $R^2$ is independently selected from the group consisting of acryloxypropyl and methacryloxypropyl.

In a sixteenth embodiment, in either the composition of the first embodiment or the method of the second embodiment, each aliphatically unsaturated monovalent hydrocarbon group for $R^3$ is an independently selected alkenyl group.

In a seventeenth embodiment, in the sixteenth embodiment, the alkenyl group is selected from the group consisting of vinyl and hexenyl.

In an eighteenth embodiment, in either the composition of the first embodiment or the method of the second embodiment, Resin/Polymer Ratio is 0.2/1 to 1.5/1. (see Inv 1 &2 and Inv 10, 14)

In a nineteenth embodiment, in the eighteenth embodiment, Resin/Polymer Ratio is 0.25/1 to 1.2/1.

In a twentieth embodiment, in either the composition of the first embodiment or the method of the second embodiment, SiH/reactive group ratio is 0.4 to 0.9.

In a twenty-first embodiment, in either the composition of the first embodiment or the method of the second embodiment, (D) the hydrosilylation reaction catalyst is selected from the group consisting of: i) a platinum group metal, ii) a compound of said metal, iii) a complex of said metal or said compound, v) the complex microencapsulated in a matrix or coreshell type structure.

In a twenty-second embodiment, in the twenty-first embodiment, (D) the hydrosilylation reaction catalyst is present in an amount sufficient to provide 10 ppm to 100 ppm of the platinum group metal based on combined weights of all starting materials in the composition.

In a twenty-third embodiment, in either the composition of the first embodiment or the method of the second embodiment, (E) the photoradical initiator is selected from the group consisting of benzophenone, a substituted benzophenone compound, acetophenone, a substituted acetophenone compound, benzoin, an alkyl ester of benzoin, xanthone, and a substituted xanthone.

In a twenty-fourth embodiment, in the twenty-third embodiment, the photoradical initiator is a substituted acetophenone.

In a twenty-fifth embodiment, in the twenty-fourth embodiment, the substituted acetophenone is 1-hydroxycyclohexyl phenyl ketone.

In a twenty-sixth embodiment, in either the composition of the first embodiment or the method of the second embodiment, starting material (E) is present in an amount of 5 to 12 parts by weight.

In a twenty-seventh embodiment, in either the composition of the first embodiment or the method of the second embodiment, (F) the hydrosilylation reaction inhibitor is present and is selected from the group consisting of acetylenic alcohols, cycloalkenylsiloxanes, ene-yne compounds, triazoles, phosphines, mercaptans, hydrazines, amines, fumarates, maleates, nitriles, ethers, carbon monoxide, alcohols, and silylated acetylenic alcohols.

In a twenty-eighth embodiment, in the twenty-seventh embodiment, the acetylenic alcohol is ethynyl cyclohexanol.

In a twenty-ninth embodiment, in either the composition of the first embodiment or the method of the second embodiment, (G) the free radical scavenger is selected from the group consisting of a phenolic compound, phenothiazine and an anaerobic inhibitor.

In a thirtieth embodiment, in the twenty-ninth embodiment, the radical scavenger is a phenolic compound.

In a thirty-first embodiment, in either the composition of the first embodiment or the method of the second embodiment, (H) the solvent is present and is selected from the group consisting of an aliphatic hydrocarbon and an aromatic hydrocarbon.

In a thirty-second embodiment, in the thirty-first embodiment, the solvent is present in an amount of 80 to 120 parts by weight, per 100 parts by weight of starting material (A).

In a thirty-third embodiment, in the method of the second embodiment, the (opto)electronic device comprises a flexible organic light emitting diode.

In a thirty-fourth embodiment, in either the composition of the first embodiment or the method of the second embodiment, starting material (J), a bis-SiH-terminated polydiorganosiloxane, is present in a weight ratio of starting material (J) to starting material (C) [(J)/(C) ratio] of 0.25/1 to 4/1.

The invention claimed is:

1. A silicone hybrid pressure sensitive adhesive composition comprising:
100 parts by weight of (A) a polydiorganosiloxane having reactive groups comprising a silicon bonded (meth) acryloxyalkyl-functional group in a pendant position and optionally a silicon bonded aliphatically unsaturated hydrocarbon group in a terminal position, wherein starting material (A) comprises unit formula $M_p M''_q D_m D'_n D''_o T'''_r Q_s$, where
M represents a unit of formula $(R^1_3 SiO_{1/2})$,
M" represents a unit of formula $(R^1_2 R^3 SiO_{1/2})$,
D represents a unit of formula $(R^1_2 SiO_{2/2})$,
D' represents a unit of formula $(R^1 R^2 SiO_{2/2})$,
D" represents a unit of formula $(R^1 R^3 SiO_{2/2})$
T''' represents a unit of formula $(R^5 SiO_{3/2})$, and
Q represents a unit of formula $(SiO_{4/2})$, where
each $R^1$ is a monovalent hydrocarbon group free of aliphatic unsaturation,
each $R^2$ is the (meth) acryloxyalkyl functional group,
each $R^3$ is the aliphatically unsaturated monovalent hydrocarbon group,
each $R^5$ is independently selected from the group consisting of $R^1$, $R^2$, and $R^3$, and
subscripts p, q, m, n, r, and s have values such that
$0 \leq p$, $0 \leq q$, a quantity $(p+q) \geq 2$,
$0 < m < 10,000$, $2 < n \leq 10,000$, $o \geq 0$, a quantity $(m+n+0)$ is 100 to 10,000, a ratio $(m+0)/n$ is 1/1 to 500/1, a ratio $(q+0)/(m+n)$ is 0 to $\leq 1/5$,
$0 \leq r \leq 100$, and $0 \leq s \leq 100$; a ratio $(m+n+0)/(r+s)$ is 50/1 to 10,000/1 if $0 < r$ or if $0 < s$;
(B) a polyorganosilicate resin in an amount sufficient to provide a weight ratio of the polyorganosilicate resin to (A) the polydiorganosiloxane (Resin/Polymer Ratio) of 0.15/1 to 1.9/1, where the polyorganosilicate resin comprises unit formula $M_a M''_b M'''D_d D'_e T'_f Q_h X_i$, where M, M", D, D', and Q are as described above, M''' represents a unit of formula $(R^1_2 R^2 SiO_{1/2})$, T' represents a unit of formula $(R^2 SiO_{3/2})$, X represents a hydroxyl group and/or alkoxy group, and subscripts a, b, c, d, e, f, h and i, have values such that;
$a \geq 0$, $b \geq 0$, $c \geq 0$ and a quantity $(a+b+c) > 10$ mole %;
$d > 0$, $e \geq 0$, and a quantity $(d+e)$ is 0 to a number sufficient to provide 30 mole % of D units and D' units combined to the resin;
$f > 0$, with the proviso that subscript f has a maximum value sufficient to provide 40 mole % of T" units to the resin;
$h > 0$, with the proviso that subscript h has a value sufficient to provide 30 mole % to 70 mole % of Q units to the resin;
$a + b + c + d + e + f + h = 100$ mole %;
$i > 0$ is not included in the molar ratio, with the proviso that subscript i has a maximum value sufficient to provide 5 mole % of hydroxyl groups to the resin;
(C) a polyorganohydrogensiloxane in an amount sufficient to provide a molar ratio of silicon bonded hydrogen atoms in starting material (C) to reactive groups in starting materials (A) and (B) combined (SiH/reactive group ratio) of 0.3 to 2, where the reactive groups are $R^2$ and $R^3$ combined, where the polyorganohydrogensiloxane comprises unit formula $M_t M^H_u D_v D^H_w T_x T^H_y Q_z$, where M, D, T, and Q represent units of the formulas shown above, and
$M^H$ represents a unit of formula $(HR^1_2 SiO_{1/2})$,
$D^H$ represents a unit of formula $(HR^1 SiO_{2/2})$,
$T^H$ represents a unit of formula $(HSiO_{3/2})$, and
subscripts t, u, v, w, x, y, and z have values such that $t \geq 0$, $u \geq 0$, $v \geq 0$, $w \geq 0$, $x \geq 0$, $y \geq 0$, $z \geq 0$, a quantity $(u+w+y) \geq 3$, and a quantity $(t+u+V+W+X+y+z)$ is sufficient to give the polyorganohydrogensiloxane a viscosity of 3 mPa·s to 1,000 mPa·s at 25° C.;
(D) a hydrosilylation reaction catalyst in an amount sufficient to provide 2 ppm to 500 ppm of platinum based on combined weights of all starting materials in the composition;
1 to 20 parts by weight, per 100 parts of starting material (A), of (E) a photoradical initiator;
0.1 to 4 parts by weight, per 100 parts of starting material (A), of (F) a hydrosilylation reaction inhibitor;
0.001 to 0.1 parts by weight, per 100 parts of starting material (A), of (G) a free radical scavenger;
0 to 120 parts by weight, per 100 parts of starting material (A), of (H) a solvent; and
0 to 2 parts by weight, per 100 parts of starting material (A), of (I) an additive selected from the group consisting of a sensitizer and a synergist.

2. The composition of claim 1, where (A) the polydiorganosiloxane comprises unit formula $M_2 D_m D'_n$, a quantity $(m+n)$ is 100 to 9,900, and a ratio m/n is 1/1 to 500/1.

3. The composition of claim 2, where when m/n ratio is 1/1, $R^2$ is present in a mole % of 0.1% to 25% based on combined amounts of $R^1$, $R^2$, and $R^3$.

4. The composition of claim 1, where (B) the polyorganosilicate resin comprises a unit formula selected from the group consisting of $M_a Q_h$, $M_a M''_b Q_h$, $M_a M''_b M'''_c Q_h$, $M_a M'''_c Q_h$, $M_a D_d Q_h$, $M_a D'_e Q_h$, $M_a M''_b D'_e Q_h$, $M_a M''_b T'_f Q_h$, $M_a M''_b T'_f Q_h$, where subscript a, b and c is 20 to 70 mole %, subscript d and e is 1 to 20 mole %, subscript f is 1 to 25 mole %, and subscript h is 35 to 65 mole %.

5. The composition of claim 1, where (C) the polyorganohydrogensiloxane crosslinker comprises unit formula $M_t M^H_u D_v D^H_w$, where a quantity $(t+u)=2$, and a quantity $(u+w) \geq 3$.

6. The composition of claim 1, where each monovalent hydrocarbon group for $R^1$ is selected independently from the group consisting of alkyl groups and aryl groups; each (meth) acryloxyalkyl functional group for $R^2$ is independently selected from the group consisting of acryloxypropyl and methacryloxypropyl; and each aliphatically unsaturated monovalent hydrocarbon group for $R^3$ is an independently selected alkenyl group.

7. The composition of claim 1, where Resin/Polymer Ratio is a weight ratio of 0.2/1 to 1.5/1.

8. The composition of claim 1, where SiH/reactive group molar ratio is 0.5/1 to 0.9/1.

9. The composition of claim 1, where (D) the hydrosilylation reaction catalyst is selected from the group consisting of: i) a platinum group metal, ii) a compound of said metal, iii) a complex of said metal or said compound, and v) the complex microencapsulated in a matrix or coreshell type structure.

10. The composition of claim 1, where (E) the photoradical initiator is selected from the group consisting of benzophenone, a substituted benzophenone compound, acetophenone, a substituted acetophenone compound, benzoin, an alkyl ester of benzoin, xanthone, and a substituted xanthone.

11. The composition of claim 1, where (F) the hydrosilylation reaction inhibitor is present and is selected from the group consisting of acetylenic alcohols, cycloalkenylsiloxanes, ene-yne compounds, triazoles, phosphines, mercaptans, hydrazines, amines, fumarates, maleates, nitriles, ethers, carbon monoxide, alcohols, and silylated acetylenic alcohols.

12. The composition of claim 1, where the radical scavenger is selected from the group consisting of a phenolic compound, phenothiazine and an anaerobic inhibitor.

13. The composition of claim 1, where (H) the solvent is present and is selected from the group consisting of an aliphatic hydrocarbon and an aromatic hydrocarbon.

14. A method for forming a protective film comprising a silicone hybrid pressure sensitive adhesive layer on a surface of a substrate, wherein the method comprises:
1) optionally treating the surface of the substrate;
2) applying the composition of claim 1 to the surface of the substrate,
3) heating the composition to form the silicone hybrid pressure sensitive adhesive layer on the surface of the substrate.

15. In a method for fabricating an (opto) electronic device the improvement comprises:
4) applying the protective film of claim 14 to the (opto) electronic device such that the silicone hybrid pressure sensitive adhesive layer contacts a passivation layer in the (opto) electronic device;
5) using the pressure sensitive adhesive film to protect the passivation layer in the device; and thereafter
6) exposing the pressure sensitive adhesive layer to UV radiation; thereby decreasing tack of the pressure sensitive adhesive layer.

16. A silicone hybrid pressure sensitive adhesive composition comprising:
100 parts by weight of (A) a polydiorganosiloxane having reactive groups comprising a silicon bonded (meth) acryloxyalkyl-functional group in a pendant position and optionally a silicon bonded aliphatically unsaturated hydrocarbon group in a terminal position, wherein starting material (A) comprises unit formula $M_p M''_q D_m D'_n D''_o T'''_r Q_s$, where
M represents a unit of formula $(R^1_3 SiO_{1/2})$,
M" represents a unit of formula $(R^1_2 R^3 SiO_{1/2})$,
D represents a unit of formula $(R^1_2 SiO_{2/2})$,
D' represents a unit of formula $(R^1 R^2 SiO_{2/2})$,
D" represents a unit of formula $(R^1 R^3 SiO_{2/2})$
T''' represents a unit of formula $(R^5 SiO_{3/2})$, and
Q represents a unit of formula $(SiO_{4/2})$, where
each $R^1$ is a monovalent hydrocarbon group free of aliphatic unsaturation,
each $R^2$ is the (meth) acryloxyalkyl functional group,
each $R^3$ is the aliphatically unsaturated monovalent hydrocarbon group,
each $R^5$ is independently selected from the group consisting of $R^1$, $R^2$, and $R^3$, and
subscripts p, q, m, n, r, and s have values such that $0 \leq p$, $0 \leq q$, a quantity $(p+q) \geq 2$,
$0 < m < 10,000$, $2 < n \leq 10,000$, $o \geq 0$, a quantity $(m+n+0)$ is 100 to 10,000, a ratio $(m+0)/n$ is 1/1 to 500/1, a ratio $(q+0)/(m+n)$ is 0 to 1/5,
$0 \leq r \leq 100$, and $0 \leq s \leq 100$; a ratio $(m+n+0)/(r+s)$ is 50/1 to 10,000/1 if $0 < r$ or if $0 < s$;

(B) a polyorganosilicate resin in an amount sufficient to provide a weight ratio of the polyorganosilicate resin to (A) the polydiorganosiloxane (Resin/Polymer Ratio) of 0.15/1 to 1.9/1, where the polyorganosilicate resin comprises unit formula $M_a M''_b M'''_c D_d D'_e T'_f Q_h X_i$, where M, M", D, D', and Q are as described above, M''' represents a unit of formula $(R^1_2 R^2 SiO_{1/2})$, T' represents a unit of formula $(R^2 SiO_{3/2})$, X represents a hydroxyl group and/or alkoxy group, and subscripts a, b, c, d, e, f, h and i, have values such that;
$a \geq 0$, $b \geq 0$, $c \geq 0$ and a quantity $(a + b + c) > 10$ mole %;
$d > 0$, $e > 0$, and a quantity $(d+e)$ is 0 to a number sufficient to provide 30 mole % of D units and D' units combined to the resin;
$f > 0$, with the proviso that subscript f has a maximum value sufficient to provide 30 mole % of T''' units to the resin;
$h > 0$, with the proviso that subscript h has a value sufficient to provide 30 mole % to 60 mole % of Q units to the resin;
$0 \leq c+e+f < 20$ mole % if $b > 0$;
$c+e+f = 0$ if $b = 0$;
$a + b + c + d + e + f + h = 100$ mole %;
$i > 0$ is not included in the molar ratio, with the proviso that subscript i has a maximum value sufficient to provide 5 mole % of hydroxyl groups to the resin;

(C) a polyorganohydrogensiloxane in an amount sufficient to provide a molar ratio of silicon bonded hydrogen atoms in starting material (C) to reactive groups in starting materials (A) and (B) combined (SiH/reactive group ratio) of 0.3 to 2, where the reactive groups are $R^2$ and $R^3$ combined, where the polyorganohydrogensiloxane comprises unit formula $M_t M^H_u D_v D^H_w T_x T^H_y Q_z$, where M, D, T, and Q represent units of the formulas shown above, and
$M^H$ represents a unit of formula $(HR^1_2 SiO_{1/2})$,
$D^H$ represents a unit of formula $(HR^1 SiO_{2/2})$,
$T^H$ represents a unit of formula $(HSiO_{3/2})$, and
subscripts t, u, v, w, x, y, and z have values such that $t \geq 0$, $u \geq 0$, $v \geq 0$, $w \geq 0$, $x \geq 0$, $y \geq 0$, $z > 0$, a quantity $(u+w+y) \geq 3$, and a quantity $(t+u+V+W+X+y+z)$ is sufficient to give the polyorganohydrogensiloxane a viscosity of 3 mPa·s to 1,000 mPa·s at 25° C.;

(D) a hydrosilylation reaction catalyst in an amount sufficient to provide 2 ppm to 500 ppm of platinum based on combined weights of all starting materials in the composition;

0.1 to 10 weight %, based on combined weights of starting materials (A), (B) and (C), of (E) a photoradical initiator;

0.0001 to 1 weight %, based on combined weights of starting materials (A), (B) and (C), of (F) a hydrosilylation reaction inhibitor;

0.001 to 0.5 weight %, based on combined weights of starting materials (A), (B) and (C), of (G) a free radical scavenger;

0 to 500 weight %, based on combined weights of starting materials (A), (B) and (C), of (H) a solvent; and 0 to 5 weight %, based on combined weights of starting materials (A), (B) and (C), of (I) an additive selected from the group consisting of a sensitizer and a synergist.

17. The composition of claim 16, where (B) the polyorganosilicate resin comprises a unit formula selected from the group consisting of $M_aQ_h$, $M_aM''_bQ_h$, $M_aM''_bM'''_c Q_h$, $M_aD_dQ_h$, $M''_bD'_eQ_h$, $M_aM''_bM'''_cD_dQ_h$, $M_aM''_bM'''_cD'_eQ_h$, $M_aM''_bD'_eQ_h$, $M_aM''_bM'''_cD'_eQ_h$, $M_aM''_bT_fQ_h$, $M_aM''_bM''T_fQ_h$, where subscript a is 20 to 65 mole %, subscript b and c is 1 to 30 mole %, subscript d and e is 1 to 20 mole %, subscript f is 1 to 25 mole %, and subscript h is 35 to 55 mole %.

\* \* \* \* \*